(12) United States Patent
Schacht et al.

(10) Patent No.: US 7,220,358 B2
(45) Date of Patent: May 22, 2007

(54) METHODS FOR TREATING MEMBRANES AND SEPARATION FACILITIES AND MEMBRANE TREATMENT COMPOSITION

(75) Inventors: Paul F. Schacht, Oakdale, MN (US); Amy B. McBroom, St. Paul, MN (US); Robert D. P. Hei, Baldwin, WI (US); Richard K. Staub, Lakeville, MN (US); Ralf Krack, Duesseldorf (DE); Peter J. Fernholz, Burnsville, MN (US); Srinivas Somayajula, Woodbury, MN (US)

(73) Assignee: Ecolab Inc., St. Paul, MN (US)

( * ) Notice: Subject to any disclaimer, the term of this patent is extended or adjusted under 35 U.S.C. 154(b) by 415 days.

(21) Appl. No.: 10/786,238

(22) Filed: Feb. 23, 2004

(65) Prior Publication Data

US 2005/0184008 A1    Aug. 25, 2005

(51) Int. Cl.
*B01D 65/02*    (2006.01)
(52) U.S. Cl. .................................... 210/636
(58) Field of Classification Search ................ 210/636
See application file for complete search history.

(56) References Cited

U.S. PATENT DOCUMENTS

| | | |
|---|---|---|
| 3,794,169 A | 2/1974 | Sisk et al. |
| 3,802,390 A | 4/1974 | Blair et al. |
| 3,840,402 A | 10/1974 | Tobin, III |
| 3,912,624 A | 10/1975 | Jennings |
| 3,992,301 A | 11/1976 | Shippey et al. |
| 4,153,545 A | 5/1979 | Zwack et al. |
| 4,222,871 A | 9/1980 | Lefeuvre |
| 4,224,963 A | 9/1980 | Stahle |
| 4,244,820 A | 1/1981 | Hauk et al. |
| 4,299,121 A | 11/1981 | Asayama et al. |
| 4,409,088 A | 10/1983 | Kanno et al. |
| 4,482,514 A | 11/1984 | Schindler et al. |
| 4,624,760 A | 11/1986 | Pottinger et al. |
| 4,740,308 A | 4/1988 | Fremont et al. |
| 4,792,401 A | 12/1988 | Truex et al. |

(Continued)

FOREIGN PATENT DOCUMENTS

AU            8934601        11/1989

(Continued)

OTHER PUBLICATIONS

Cheryan, M. Ultrafiltration Handbook, 1986, Technomic Publishing, p. 193-194, 235.*

(Continued)

*Primary Examiner*—W. L. Walker
*Assistant Examiner*—Benjamin Kurtz
(74) *Attorney, Agent, or Firm*—Merchant & Gould, P.C.

(57) ABSTRACT

A method for treating a separation facility is provided according to the invention. The separation facility includes a plurality of membranes for providing separation of a feed product. The method includes steps of providing liquid flow through a plurality of membranes; treating the plurality of membranes with a multiple phase treatment composition comprising a gaseous phase and a liquid phase at a volumetric ratio of the gaseous phase to the liquid phase of at least about 5:1; and providing a liquid flow through the plurality of membranes.

12 Claims, 4 Drawing Sheets

U.S. PATENT DOCUMENTS

| | | | |
|---|---|---|---|
| 4,801,375 A | 1/1989 | Padilla | |
| 4,871,683 A | 10/1989 | Harris et al. | |
| 4,923,609 A | 5/1990 | Jardine | |
| 4,943,374 A | 7/1990 | Heininger et al. | |
| 5,028,329 A | 7/1991 | Drioli et al. | |
| 5,039,324 A | 8/1991 | Goldberg | |
| 5,147,309 A | 9/1992 | Hemmerich et al. | |
| 5,169,412 A | 12/1992 | Prasad et al. | |
| 5,171,446 A | 12/1992 | Shen | |
| 5,221,477 A | 6/1993 | Melcher et al. | |
| 5,242,046 A | 9/1993 | Bailey | |
| 5,395,429 A | 3/1995 | Sutsko et al. | |
| 5,456,843 A | 10/1995 | Koenhen | |
| 5,560,828 A | 10/1996 | Wenten et al. | |
| 5,605,628 A | 2/1997 | Davidson et al. | |
| 5,643,455 A * | 7/1997 | Kopp et al. | 210/636 |
| 5,690,830 A | 11/1997 | Ohtani et al. | |
| 5,801,051 A | 9/1998 | Kiefer et al. | |
| 6,004,374 A | 12/1999 | Rao et al. | |
| 6,027,572 A | 2/2000 | Labib et al. | |
| 6,071,356 A | 6/2000 | Olsen | |
| 6,112,908 A | 9/2000 | Michaels | |
| 6,158,721 A | 12/2000 | Katou et al. | |
| 6,161,250 A | 12/2000 | Young et al. | |
| 6,174,351 B1 | 1/2001 | McDowell et al. | |
| 6,197,203 B1 | 3/2001 | Ishida et al. | |
| 6,197,739 B1 | 3/2001 | Oakes et al. | |
| 6,214,231 B1 | 4/2001 | Cote et al. | |
| 6,261,457 B1 | 7/2001 | Wenthold et al. | |
| 6,280,626 B1 | 8/2001 | Miyashita et al. | |
| 6,288,222 B1 | 9/2001 | Roth et al. | |
| 6,326,340 B1 | 12/2001 | Labib et al. | |
| 6,351,864 B1 | 3/2002 | Karafa et al. | |
| 6,355,173 B1 | 3/2002 | den Bieman et al. | |
| 6,387,189 B1 | 5/2002 | Gröschl et al. | |
| 6,402,956 B1 | 6/2002 | Andou et al. | |
| 6,454,871 B1 | 9/2002 | Labib et al. | |
| 6,485,762 B1 | 11/2002 | Rizvi et al. | |
| 6,499,606 B1 | 12/2002 | Grangeon et al. | |
| 6,515,115 B1 | 2/2003 | Kwant et al. | |
| 6,524,481 B2 | 2/2003 | Zha et al. | |
| 6,619,302 B2 | 9/2003 | Labib et al. | |
| 2001/0047962 A1* | 12/2001 | Zha et al. | 210/636 |
| 2002/0108906 A1* | 8/2002 | Husain et al. | 210/636 |
| 2002/0112743 A1* | 8/2002 | Tabani et al. | 134/22.12 |
| 2003/0047510 A1* | 3/2003 | Baldridge et al. | 210/632 |
| 2004/0007255 A1* | 1/2004 | Labib et al. | 134/30 |

FOREIGN PATENT DOCUMENTS

| | | |
|---|---|---|
| CN | 1221648 | 7/1999 |
| DE | 2818127 A1 | 11/1978 |
| DE | 3818919 | 12/1989 |
| DE | 4101045 | 8/1991 |
| DE | 4109732 | 10/1992 |
| DE | 4226673 | 2/1994 |
| DE | 19724172 A1 | 12/1998 |
| DE | 19730441 A1 | 1/1999 |
| DE | 10004863 A1 | 2/2001 |
| DE | 19920269 A1 | 3/2001 |
| EP | 301597 | 2/1989 |
| EP | 0 490 117 A1 | 6/1992 |
| EP | 0 160 014 B1 | 1/1993 |
| EP | 526372 A1 | 2/1993 |
| EP | 645174 A1 | 3/1995 |
| EP | 0 970 922 A2 | 1/2000 |
| FR | 2707520 A1 | 1/1995 |
| FR | 2727787 A1 | 6/1996 |
| JP | 51071880 A2 | 6/1976 |
| JP | 52058078 A2 | 5/1977 |
| JP | 53108882 | 9/1978 |
| JP | 54067574 | 5/1979 |
| JP | 55049887 B4 | 12/1980 |
| JP | 56024006 | 3/1981 |
| JP | 56015924 B4 | 4/1981 |
| JP | 61153104 A2 | 7/1986 |
| JP | 61192309 A2 | 8/1986 |
| JP | 63104610 A2 | 5/1988 |
| JP | 63126513 A2 | 5/1988 |
| JP | 63147506 | 6/1988 |
| JP | 01104309 | 4/1989 |
| JP | 01262903 | 10/1989 |
| JP | 01262904 | 10/1989 |
| JP | 02183749 | 7/1990 |
| JP | 03042018 | 2/1991 |
| JP | 04317726 | 11/1992 |
| JP | 05277345 | 10/1993 |
| JP | 06023246 | 2/1994 |
| JP | 07000770 A2 | 1/1995 |
| JP | 07246320 A2 | 9/1995 |
| JP | 07313851 A2 | 12/1995 |
| JP | 09108670 A2 | 4/1997 |
| JP | 09117647 | 5/1997 |
| JP | 09262442 A2 | 10/1997 |
| JP | 10052377 A2 | 2/1998 |
| JP | 10057957 A2 | 3/1998 |
| JP | 10085562 A2 | 4/1998 |
| JP | 11057415 | 3/1999 |
| JP | 11077042 A2 | 3/1999 |
| JP | 11104636 A2 | 4/1999 |
| JP | 11165186 A2 | 6/1999 |
| JP | 11169684 | 6/1999 |
| JP | 11197685 A2 | 7/1999 |
| JP | 11256193 | 9/1999 |
| JP | 11309346 A2 | 11/1999 |
| JP | 2000000598 | 1/2000 |
| JP | 2000051670 A2 | 2/2000 |
| JP | 2000061273 | 2/2000 |
| JP | 2000325758 A2 | 11/2000 |
| JP | 2001038164 A2 | 2/2001 |
| JP | 2001079366 | 3/2001 |
| JP | 2001104760 | 4/2001 |
| JP | 2001145676 | 5/2001 |
| JP | 2001205055 | 7/2001 |
| JP | 2001259384 | 9/2001 |
| KR | 2001018168 | 3/2001 |
| RU | 2033579 | 4/1995 |
| RU | 2046080 | 10/1995 |
| SU | 743691 | 7/1980 |
| SU | 948386 | 8/1982 |
| SU | 1350434 | 11/1987 |
| SU | 1532099 | 12/1989 |
| SU | 1701358 A1 | 12/1991 |
| WO | WO 9517526 A1 | 6/1995 |
| WO | WO 9733832 A1 | 9/1997 |
| WO | WO 2000018498 A1 | 4/2000 |

OTHER PUBLICATIONS

Cheryan, M. Ultrafiltration Handbook, 1998, Technomic Publishing, p. 277.*

"AirFlush® processing: Minimise chemicals by AIR-enhanced membrane cleaning," http://www.xflow.nl/english/concepten/airflush.html, 3 pages (Date Printed Feb. 15, 2002).

Allen, V. et al., "Test program for physical cleaning and fouling prevention in reverse osmosis systems," Report, CEL-CR-78.010, Order AD-A055624 (1978) (1 page abstract).

Balek, W., "Overview of Food Safety Regulation in the United States," International Sanitary Supply Association, pp. 1-8 (Mar. 30, 2001).

Bellara, S. et al., "Gas Sparging to enhance permeate flux in ultrafiltration using hollow fibre membranes," Journal of Membrane Science, vol. 121, No. 2, pp. 175-184 (Dec. 11, 1996) (1 page abstract).

Bellara, S. et al., "Flux enhancement in hollow fiber membrane systems," *IChemE Res. Event, Eur. Conf. Young Res. Chem. Eng., 2nd*, vol. 1, pp. 310-312 (1996) (1 page abstract).

Bodzek, M., "Membrane techniques in air cleaning," *Pol. J. Environ. Stud.*, vol. 9, No. 1, pp. 1-12 (2000) (1 page abstract).

Bouhabila, E. et al., "Microfiltration of activated slude using submerged membrane with air bubbling (application to wastewater treatment)," *Desalination*, vol. 118, Nos. 1-3, pp. 315-322 (1998) (1 page abstract).

Bouhabila, E. et al., "Fouling characterization in membrane bioreactors," *Separation and Purification Technology*, vol. 22 and 23, Nos. 1-3, pp. 123-132 (2001) (1 page abstract).

Bourcier, W. et al., "Pretreatment of oil field and mine waste waters for reverse osmosis," *Environ. Sci. Res.*, vol. 52, pp. 509-519 (1996) (1 page abstract).

Cabassud, C. et al., "Flux enhancement by a tangential gas flow in ultrafiltration hollow fibers for drinking water production," *Proc.-World Filrt. Congr., 7th*, vol. 2, pp. 496-500 (1996) (1 page abstract).

Cabassud, C. et al., "How slug flow can improve ultrafiltration flux in organic hollow fibres," *Journal of Membrane Science*, vol. 128, pp. 93-101 (1997).

Cabassud, C. et al., "Air sparging in ultrafiltration hollow fibers: relationship between flux enhancement, cake characteristics and hydrodynamic parameters," *Journal of Membrane Science*, vol. 181, No. 1, pp. 57-69 (Jan. 15, 2001) (1 page abstract).

Chakma, A., "Separation of CO2 and SO2 from flue gas streams by liquid membranes," *Energy Convers. Manage.*, vol. 36, Nos. 6-9, pp. 405-410 (1995) (1 page abstract).

Chang, S. et al., "Characteristics of microfiltration of Suspensions with inter-fiber two-phase flow," *Journal of Chemical Technology & Biotechnology*, vol. 75, No. 7, pp. 533-540 (2000) (1 page abtract).

Cheng, T. et al., "Effects of gas slugs and inclination angle on the ultrafiltration flux in tubular membrane module," *J. Membr. Sci.*, vol. 158, Nos. 1-2, pp. 223-234 (1999) (1 page abstract).

Cheng, T., "Influence of inclination on gas-sparged crossflow ultrafiltration through an inorganic tubular membrane," *Journal of Membrance Science*, vol. 196, No. 1, pp. 103-110 (2002) (1 page abstract).

Chevyan, M., "Introduction. Definition and Classification of Membrane Separation Processes," *Ultrafiltration and Microfiltration Handbook*, 22 pages (1998).

Cui, Z. et al., "Flux enhancements with gas sparging in downloads crossflow ultrafiltration: performance and mechanism," *J. Membr. Sci.*, vol. 117, Nos. 1-2, pp. 109-116 (1996) (1 page abstract).

Cui, Z. et al., "Airlift crossflow membrane filtration—a feasibility study with dextran ultrafiltration," *Journal of Membrane Science*, vol. 128, No. 1, pp. 83-91 (May 28, 1997) (1 page abstract).

Cui, Z. et al., "Water Treatment with Membranes and Membrane Bioreactors," http://www.eng.ox.ac.uk.World/Research/Summary/B-Biotech.html, 1 page (May 17, 2002).

"Desal™ Membrane Products, Food & Dairy Sanitary Ultrafiltration PES—10,000 MWCO," *Osmonics*, 2 pages (Date Unknown).

"Desal® Membrane Products, Dairy Processing Sanitary Ultrafiltration PES—10,000 MWCO," http://www.osmonics.com/Literature/Literature.asp?G=31, 2 pages (Date Printed Mar. 12, 2003).

Duin, O. et al., "Direct nanofiltration or ultrafiltration of WWTP effluent?," *Proceedings of the Conference on Membranes in Drinking and Industrial Water Production*, vol. 2, pp. 105-112 (Oct. 2000).

Dunham, S. et al., "Membrane Cleaning Under the Microscope Successful Cleaning Means Knowing the Foulant," *Water Technology*, 4 pages (Sep. 1995).

Eltron Research, Inc., "In Situ Electrolytic System for Ultrafiltration Membrane Cleaning," (1 page abstract).

Fazel, M. et al., "A statistical review of 150 membrane autopsies," 7 pages (Date Unknown).

Gotham, S. et al., "Model Studies of Food Fouling," pp. 1-13 (Date Unknown).

Ghosh, R. et al., "Mass transfer in gas-sparged ultrafiltration: upward slug flow in tubular membranes," *Journal of Membrane Science*, vol. 162, Nos. 1-2, pp. 91-102 (Sep. 1, 1999) (1 page abstract).

Hong, S. et al., "Assessing pathogen removal efficiency of microfiltration by monitoring membrane integrity," *Water & Technology: Water Supply*, vol. 1, No. 4, pp. 43-48 (2001) (1 page abstract).

Huang, J. et al., "Pilot-plant study of a high recovery membrane filtration process for drinking water treatment," *Water Science and Technology*, vol. 41, Nos. 10-11, pp. 77-84 (2000) (1 page abstract).

Imasaka, T. et al., "Application of gas-liquid two-phase cross-flow filtration to pilot-scale methane fermentation," *Drying Technol.*, vol. 11, No. 4, pp. 769-785 (1993) (1 page abstract).

Jacangelo, J. et al., "The membrane treatment," *Civil Engineering*, 7 pages (Sep. 1998) http://www.pubs.asce.org/ceonline/sepfeat.html.

Jenkins, S. et al., "Fluorometric analysis of the uniformity of deposition on cassette membrane filters," *Appl. Occup. Environ. Hyg.*, vol. 7, No. 10, pp. 665-671 (1992) (1 page abstract).

Kennedy, M. et al., "Improving the performance of dead-end ultrafiltration systems: comparing air and water flushing," *Water Science and Technology: Water Supply*, vol. 1, No. 5/6, pp. 97-106 (2001).

Klein, G. et al., "Fouling in Membrane Apparatus: The Mechanisms of Particle Deposition," *Trans IChemE*, vol. 77, Part C, pp. 119-126 (Jun. 1999).

Laborie, S. et al., "Flux enhancement by a continuous targential gas flow in ultrafiltration hollow fibers for drinking water production: effects of slug flow on cake structure," *Filtr. Sep.*, vol. 34, No. 8, pp. 887-891 (1997) (1 page abstract).

Laborie, S. et al., "Fouling control by air sparging inside hollowing fiber membranes—effects on energy consumption," *Desalination*, vol. 118, No. 1-3, pp. 189-196 (1998) (1 page abstract).

Laborie, S. et al., "Characterisation of gas-liquid two-phase flow inside capillaries," *Chemical Engineering Science*, vol. 54, No. 23, pp. 5723-5735 (Dec. 1999) (1 page abstract).

Laitinen, N. et al., "Effect of filtration conditions and backflushing on ceramic membrane ultrafiltration of board industry wastewaters," *Separation and Purification Technology*, vol. 24, Nos. 1-2, pp. 319-328 (2001) (1 page abstract).

Makardij, A. et al,. "Microfiltration and ultrafiltration of milk: Some aspects of fouling and cleaning," *Trans IChemE*, vol. 77, Part C, pp. 107-113 (Jun. 1999).

"Market Engineering Measurement Analysis of the Total Ultrafiltration, Nanofiltration, and Reverse Osmosis Membrane Elements Market," *U.S. Ultrafiltration, Nanofiltration, and Reverse Osmosis Filter Element Markets 5318-15*, pp. 3-1-3-6 (2000).

Mercier, M. et al., "How slug flow can enhance the ultrafiltration flux in mineral tubular membranes," *Journal of Membrane Science*, vol. 128, pp. 103-113 (1997).

Mercier, M. et al., "Membrane bioreactors in fermentation process—two-phase flow may be a solution to enhance crossflow filtration flux," *BHR Group Conf. Ser. Publ.*, vol. 25, pp. 331-348 (1997) (1 page abtract).

Mercier, M. et al., "Yeast suspension filtration: flux enhancement using an upward gas/liquid slug flow—application to continuous alcoholic fermentation with cell recycle," *Biotechnol. Bioeng.*, vol. 58, No. 1, pp. 47-57 (1998) (1 page abstract).

Mercier-Bonin, M. et al., "Influence of a gas/liquid two-phase flow on the ultrafiltration and microfiltration performances: case of a ceramic flat sheet membrane," *Journal of Membrane Science*, vol. 180, No. 1, pp. 93-102 (2000) (1 page abstract).

Mercier-Bonin, M. et al., "Hydrodynamics of a slug flow applied to cross-flow filtration in narrow tubes," *AIChE J.* vol. 46, No. 3, pp. 476-488 (2000) (1 page abstract).

Mercier-Bonin, M. et al., "How unsteady filtration conditions can improve the process efficiency during cell cultures in membrane bioreactors," *Separation and Purification Technology*, vol. 22 and 23, No. 1-3, pp. 601-615 (2001) (1 page abstract).

Mikulasek, P. et al., "The use of flux enhancement methods for high flux cross-flow membrane microfiltration systems," *Chemical and Biochemical Engineering Quarterly*, vol. 14, No. 4, pp. 117-123 (2000) (1 page abstract).

Mikulasek, P. et al., "Flux enhancement by gas-liquid two-phase flow for crossflow microfiltration in a tubular ceramic membrane," *J. Filtr. Soc.*, vol. 2, No. 1, pp. 20-26 (2001) (1 page abstract).

Nordman-Montelius, M. et al., "Analysis of Raw Milk Deposits on Non-Heated Polymer Surfaces," pp. 276-285 (Date Unknown).

Paul, D. et al., "Membrane separation processes for clean production," *Environ. Prog.*, vol. 17, No. 3, pp. 137-141 (1998) (1 page abstract).

Paulson, D., Membranes, the Finest Filtration, *Filtration News*, http://www.osmonics.com/products/Page698.htm, 9 pages (Jul. 1, 1995).

Princeton Trade & Technology Inc., "Cleaners for Wastewater Ultrafiltration Membranes," (1 page abstract).

Rogut, J., "Design and development of high performance gas-liquid membrane contractors for SO2 and NOx removal from flue gases," *Proc. Int. Tech. Conf. Coal Util. Fuel Syst.*, vol. 21, pp. 87-98 (1996) (1 page abstract).

Roorda, J. et al., "Understanding membrane fouling in ultrafiltration of WWTP-effluent," *Water Science and Technology*, vol. 41, No. 10-11, pp. 345-353 (2000).

Ruiz, J. et al., "Solid aerosol removal using ceramic filters," *Separation and Purification Technology*, vol. 19, No. 3, pp. 221-227 (Jul. 1, 2000) (1 page abstract).

Sandu, C. et al., "Fouling of Heating Surfaces—Chemical Reaction Fouling Due to Milk," pp. 122-167 (Date Unknown).

Scott, K. et al., "Intensified membrane filtration with corrugated membranes," *Journal of Membrane Science*, vol. 173, No. 1, pp. 1-16 (2000) (1 page abstract).

Serra, C. et al., "Use of air sparging to improve backwash efficiency in hollow-fiber modules," *Journal of Membrane Science*, vol. 161, No. 1-2, pp. 95-113 (2002) (1 page abstract).

Shimizu, Y. et al., "Filtration characteristics of hollow fiber microfiltration membranes used in membrane bioreactor for domestic wastewater treatment," *Water Res.*, vol. 30, No. 10, pp. 2385-2392 (1996) (1 page abstract).

"Standard Test Methods for Pore Size Characateristics of Membrane Filters by Bubble Point and Mean Flow Pore Test," pp. 1-7 (Date Unknown).

"The Environmental Technology Centre," http://www.nottingham.ac.uk/~enzetc/technology/cmf.htm, 2 pages (Date Printed Mar. 21, 2003).

"The Environmental Technology Verification Program. ETV Joint Verification Statement," *U.S. Environmental Protection Agency*, pp. VS-i-VS-vi (Sep. 2000).

"U-Tube Reactor and Ultrafiltration Membrane," Water Pollution Control Technology in Japan, Nightoil Treatment, 3 pages (Date Printed Jun. 21, 2002) http://nett21.unep.or.jp/CTT_DATA/WATER/WATER_3/html/Water-165.html.

Väisänen, P. et al., "Treatment of UF membranes with simple and formulated cleaning agents," *Trans IChemE*, vol. 80, part C, pp. 98-108 (Jun. 2002).

Verberk, J. et al., Combined air-water flush in dead-end ultrafiltration, *Proceedings of the Conference on Membranes in Drinking and Industrial Water Production*, vol. 2, pp. 655-663 (Oct. 2000).

Verberk, J. et al., "Combined air-water flush in dead-end ultrafiltration," *Water Science and Technology: Water Supply*, vol. 1, No. 5/6, pp. 393-402 (2001).

Verberk, J., "Air-water cleaning for micro and ultrafiltration," http://www.gezondheidstechniek.tudelft.nl\verberk.htm, 4 pages (Apr. 16, 2002).

Verberk, J, et al., "Hydraulic distribution of water and air over a membrane module using AirFlush® ," *Water Science and Technology: Water Supply*, vol. 2, No. 2, pp. 297-304 (2002).

Verberk, J. et al., "Combined air-water flush in dead-end ultrafiltration," *TU Delft*, 1 page (Date Unknown).

Wang, Z. et al., "Characteristics of dextran and BSA fouling of PS membrane and its microscopic mechanism," *Shuichuli Jishu*, vol. 26, No. 5, pp. 273-276 (2000) (1 page abstract).

* cited by examiner

METHODS FOR TREATING MEMBRANES AND SEPARATION FACILITIES AND MEMBRANE TREATMENT COMPOSITION

FIELD OF THE INVENTION

The invention relates to methods for treating membranes using multiple phase flow, methods for treating separation facilities using multiple phase flows, and treatment compositions. Membranes provided within a separation facility can be treated using multiple phase flow to provide flushing, rinsing, pretreatment, cleaning, sanitizing and preserving.

BACKGROUND OF THE INVENTION

The use of a two-phase liquid/gas stream to clean pipelines is disclosed in European Patent Application 0 490 117 A1 to Kuebler that was published on Jun. 17, 1992 as an alternative to conventional clean-in-place techniques in order to reduce the amount of chemicals used. Kuebler describes cleaning pipelines using a two-phase liquid/gas stream and a reduction in throughput of the cleaning liquid by several orders of magnitude relative to conventional clean-in-place techniques. According to Kuebler:

If two phases, namely liquid and gas, flow through a pipeline, then extremely different flow patterns are possible which are dependant, in particular, on the proportion of the gas passing through and also on whether these phases are passing through horizontal, vertical, or inclined pipes. The gas and liquid generally flow in the same direction. In vertical or markedly inclined pipes, however, counter flow of the gas relative to the liquid is also possible. The transitions between the individual existence regions of the flow patterns can be fluid; depending on the pair of phases, considerable differences can also arise from the boundaries of the flow patterns.

The cleaning process is also conceivable by means of plug flow or froth flow within the framework of the cleaning process. However, the use of two-phase gas/liquid flow is preferable, whereby such flow is in the form of annular flow through the pipeline system. The term annular flow is to be understood to mean flow in which the liquid forms a film, which is usually thin, along the wall of the pipe, and the gas flows in the center of the pipe. The two phases are thereby separated from one another by a more or less well-defined boundary layer that corresponds approximately to the interior wall of the pipeline. A comprehensive presentation of two-phase annular flow phenomena is given in Hewitt, Hall Taylor: "Annular Two-Phase Flow" (Pergamon Press, 1970), the contents of which are incorporated herein by reference.

The form in which the liquid is fed into the pipeline is not especially important for the formation of annular flow. Thus, the liquid could be fed into the stream of gas by one or more central nozzles, or even in an annular manner via a porous pipe component or an annular line. If liquid is fed centrally, then disperse annular flow will generally be produced in which finely divided liquid droplets are swept along in the stream of gas.

However, the pressure loss is reduced by a tangential inward flow direction of the liquid and/or an inward flow direction of the liquid that is inclined at an angle to the pipe axis; this is because the stream of gas has to muster less energy in order to accelerate the liquid annulus, and less liquid will be swept along by the gas in the center of the pipe.

Annular feeding at the pipe's periphery is to be provided, rather, for mild cleaning processes for vertical or slightly inclined pipes in which case the liquid flows in the form of a thin film along the interior wall of the pipe and the gas is capable of flowing either in the direction of the stream of liquid or even counter thereto.

A quite well-defined operating region is found to be especially advantageous for the formation of annular flow with high cleaning action and minimal consumption of liquid, whereby this is independent of the pipe's being orientated horizontally or vertically. The two-phase liquid/gas flow ratio being 1 m$^3$:3000 to 7500 m$^3$ or, respectively, 1 kg:2.0 to 6.0 kg. Thus, for example, the consumption of approximately 30 L of liquid is required for a cleaning time of approximately ten minutes in the case of a pipe line system that has a pipe diameter of 65 mm, whereby this is independent of it's length, whereas approximately 80,000 L of liquid would be necessary in the case of complete filling of the pipeline with the cleaning liquid.

Various flow patterns are possible for a two-phase flow. The following list indicates the various flow patterns: bubble flow, which contains gas bubbles in the uppermost part of the pipe; plug flow, which contains bullet-shaped gas plugs moving along in the uppermost part of the pipe; stratified flow, where the two-phases are separated by a smooth interface; pulse flow, where the phase boundary is formed in an undulating manner; surge flow, which results after pulse flow with increasing speed of the gas flow; and annular flow, which occurs after surge flow with yet a further increase in gas speed flow. Annular flow is certainly to be preferred for economical though effective cleaning. However, plug flow or surge flow would be usable for pipe cleaning with more economical consumption of the cleaning liquid than the conventional pipe filling with cleaning liquid.

There are various ways that liquid can be fed into the pipe. The liquid can be introduced via an annular inlet. In addition, a more favorable approach, the liquid is fed, under pressure, into the pipe via an inlet nozzle. The nozzle can be inclined at an angle, preferably 45°, to the axis of the pipe. The inlet nozzles can stop at the inner surface of the pipe or protrude essentially into the center of the pipe.

The flow patterns in a horizontal pipe can be estimated roughly in a diagram referred to as a Baker diagram. The diagram that is obtained purely empirically is usable for liquid/gas phases that are comparable to water/air as the pair of substances. The abscissa/x-axis is represented by $G_L * \lambda_B * \Psi_B / G_G$ and is plotted against the expression $G_G/\lambda_B$. $\lambda$ is a density/surface tension parameter and $\Psi$ is a viscosity/surface tension parameter. $G_L$ and $G_G$ are the mass flows for the liquid and gas in lb/h*ft$^2$ and $\lambda_B$ and $\Psi_B$ are defined by $$\lambda_B = \left[\left(\frac{\rho_G}{\rho_A}\right)\left(\frac{\rho_L}{\rho_W}\right)\right]^{0.5}; \text{ and}$$

$$\Psi_B = \frac{\sigma_W}{\sigma}\left[\left(\frac{\mu_L}{\mu_W}\right)\left(\frac{\rho_W}{\rho_L}\right)^2\right]^{\frac{1}{3}}$$

ρ are the density values, σ the surface tension, and μ the viscosity of the liquid. The indices A and W designate the values for air and water, respectively; L and G, as already indicated above, designate those for the liquid and gas, respectively. It is important to find an operating region that insures annular flow with the flow of a stream of liquid water, which is as small as possible. This region is defined by having the expression $G^L*\lambda*\Psi_B/G_G$ be between 0.1 and 0.4, and the expression $G_G/\lambda_B$ be between $2*10^4$ and $10^5$.

A mixture of gas and a suitable liquid, preferably including one or more cleaning agents, can also be used to create a mixed-phase flow along an interior surface of a small bore tubing, which creates shear or impact stresses or similar conditions sufficient to remove biofilm, debris and contaminants from their surfaces. The small bore tubing usually has a diameter of less than 0.8 inches. The cleaning agent is commonly a surfactant, but may also be or include an oxidizing agent, an alcohol, a non-surfactant detergent or a solid material. The method may be applied to passageway geometries of considerable complexity, including surfaces made of a porous membrane. It further includes optimally varying parameters such as the fluid mechanics regime of the mixed-phase flow, the chemistry of the cleaning liquid, temperature, and, in the case of membranes, the direction, magnitude and sequencing of pressure differences across the membrane.

Additional publications describing mixed phased flow include, for example, U.S. Pat. No. 6,326,340 to Labib et al.; U.S. Pat. No. 6,454,871 to Labib et al.; and U.S. Pat. No. 6,027,572 to Labib et al.

Filtration membranes have a tendency to foul during processing. Fouling manifests itself as a decline in flux with time of operation. Flux decline should occur when all operating parameters, such as pressure, flow rate, temperature, and feed concentration are kept constant. In general, membrane fouling is a complicated process and is believed due to a number of factors including electrostatic attraction, hydrophobic and hydrophilic interactions, the deposition and accumulation of feed components, e.g., suspended particulates, impermeable dissolved solutes, and even normally permeable solutes, on the membrane surface and/or within the pores of the membrane. It is expected that almost all feed components will foul membranes to a certain extent. See Munir Cheryan, Ultrafiltration and Microfiltration Handbook, Technical Publication, Lancaster, Pa., 1998 (Pages 237-288). Fouling components and deposits can include inorganic salts, particulates, microbials and organics.

Filtration membranes typically require periodic cleaning to allow for successful industrial application within separation facilities such as those found in the food, dairy, and beverage industries. The filtration membranes can be cleaned by removing foreign material from the surface and body of the membrane and associated equipment. The cleaning procedure for filtration membranes can involve a CIP process or "clean-in-place" process where cleaning agents are circulated over the membrane to wet, penetrate, dissolve and/or rinse away foreign materials from the membrane. Various parameters that can be manipulated for cleaning typically include time, temperature, mechanical energy, chemical composition, chemical concentration, soil type, water type, hydraulic design, and membrane materials of construction.

Chemical energy in the form of detergents and cleaners can be used to solubilize or disperse the foulant or soil. Thermal energy in the form of heat can be used to help the action of the chemical cleaners. In general, the greater the temperature of the cleaning the solution, the more effective it is as a cleaning treatment, although most membrane materials have temperature limitations due to the material of construction. Many membranes additionally have chemical limitations. Mechanical energy in the form of high velocity flow also contributes to the successful cleaning of membrane systems. See Munir Cheryan, Ultrafiltration and Microfiltration Handbook, Technical Publication, Lancaster, Pa., 1998, pages 237-288.

In general, the frequency of cleaning and type of chemical treatment performed on the membrane has been found to affect the operating life of a membrane. It is believed that the operating life of a membrane can be decreased as a result of chemical degradation of the membrane over time. Various membranes are provided having temperature, pH, and chemical restrictions to minimize degradation of the membrane material. For example, many polyamide reverse osmosis membranes have chlorine restrictions because chlorine can have a tendency to damage the membrane. Cleaning and sanitizing filtration membranes is desirable in order to comply with laws and regulations that may require cleaning in certain applications (e.g., the food and biotechnology industries), reduce microorganisms to prevent contamination of the product streams, and optimize the process by restoring flux. See Munir Cheryan, Ultrafiltration and Microfiltration Handbook, Technical Publication, Lancaster, Pa., 1998, pages 237-288.

Other exemplary techniques for cleaning filtration membranes are disclosed by U.S. Pat. No. 4,740,308 to Fremont et al.; U.S. Pat. No. 6,387,189 to Gröschl et al.; U.S. Pat. No. 6,071,356 to Olsen; and Munir Cheryan, Ultrafiltration and Microfiltration Handbook, Technical Publication, Lancaster, Pa., 1998 (Pages 237-239).

SUMMARY OF THE INVENTION

A method for treating a separation facility is provided according to the invention. The separation facility includes a plurality of membranes for providing separation of a feed product. The method includes steps of providing liquid flow through a plurality of membranes; treating the plurality of membranes with a multiple phase treatment composition comprising a gaseous phase and a liquid phase at a volumetric ratio of the gaseous phase to the liquid phase of at least about 5:1; and providing a liquid flow through the plurality of membranes.

An alternative method for treating a separation facility including a separation membrane is provided according to the invention. The method includes steps of displacing product from the separation membrane; treating the separation membrane with a multiple phase treatment composition comprising a gaseous phase and a liquid phase at a volumetric ratio of the gaseous phase to the liquid phase to provide a liquid phase on the separation membrane; diluting the liquid phase on the separation membrane to provide a liquid composition; and recirculating the liquid composition in the separation facility.

A method for treating membranes is provided according to the invention. The method includes steps of: rinsing a membrane with a first liquid rinse composition; treating the membrane with a first multiple phase treatment composition comprising a gaseous phase and a liquid phase at a volumetric ratio of the gaseous phase to the liquid phase of at least about 5:1; flooding the membrane with water to provide a first liquid treatment composition and recirculating the first liquid treatment composition within the membrane; removing the first liquid treatment composition from the membrane; and treating the membrane with a second multiple phase treatment composition comprising a gaseous phase and a liquid phase at a volumetric ratio of the gaseous phase to the liquid phase of at least about 5:1.

A method for cleaning a filtration system is provided according to the invention. The method includes steps of removing liquid product from the filtration system and recovering at least a part of the liquid product; flooding the filtration system with a first aqueous media to remove at least a portion of the solids in the filtration system; flushing the filtration system with a gaseous media to remove at least a portion of the first aqueous media; treating the filtration system with a multiple phase treatment composition comprising a gaseous phase and a liquid phase; flooding the filtration system with a second aqueous media; and rinsing the filtration system.

A separation facility is provided according to the invention. The separation facility includes a plurality of membranes provided in vessels and constructed for providing separation; multiple phase flow equipment provided for delivering a multiple phase treatment composition to the plurality of membranes in the vessels; and liquid flow equipment provided for delivering liquid flow to the plurality of membranes in the vessels.

A multiple phase treatment composition is provided according to the invention. The multiple phase treatment composition includes a gaseous phase and a liquid phase where the gaseous phase and the liquid phase are provided at a volumetric ratio of between about 5:1 and about 75,000:1 and provided at a liquid phase flow rate of about 0.1 gal/min. to about 15 gal/min., and where the gaseous phase comprises air and the liquid phase comprises an active concentration of at least about 1 wt. %. The active concentration refers to the non-aqueous portion of the liquid phase.

DISCUSSION OF THE INVENTION

Figure 1:
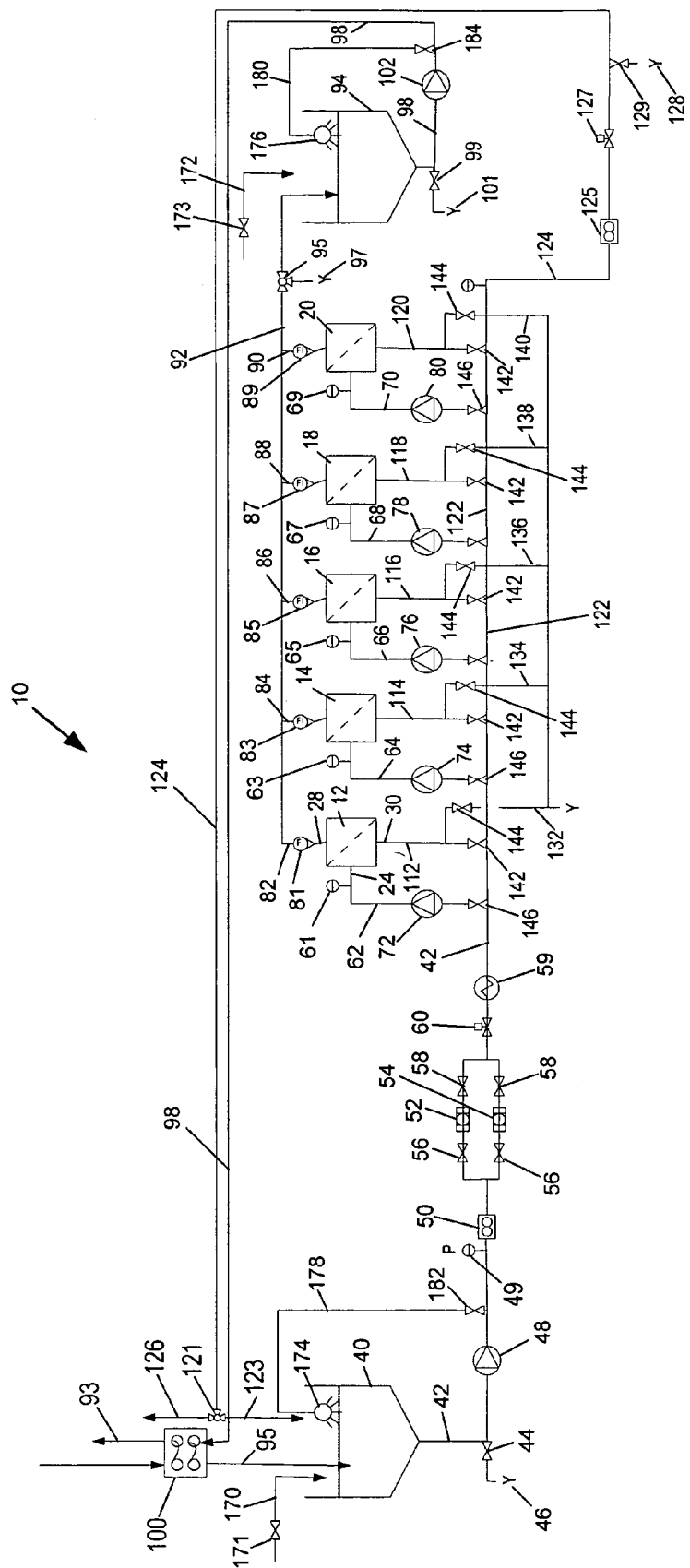
FIG. 1 is a diagram of an exemplary separation facility useful for separation of dairy product.

Methods for treating membranes using multiple phase flow, methods for treating separation facilities using multiple phase flow, and membrane treatment compositions are provided according to the invention. Exemplary treatments using multiple phase flow include flushing, rinsing, pretreatment, cleaning, sanitizing and preserving.

Conventional flow for membrane cleaning refers to a flooded hydraulic delivery system where the membrane treatment chemistry is diluted with water and allowed to flow over and through the membrane. Conventional flow can be referred to as liquid flow and/or single phase flow. Liquid flow can be characterized by a general absence of a gaseous phase that provides for delivery of the liquid. It should be understood that the phrase "single phase flow" is not intended to exclude the existence of solids such as debris that may become a part of the liquid flow. Multiple phase flow refers to a system that utilizes a gaseous phase and liquid phase where the gaseous phase is used to deliver the liquid phase. Multiple phase flow in the context of treating a membrane refers to a system that utilizes a gaseous phase to deliver or carry a liquid to the surface of the membrane for a treatment. The treatment can include, for example, flushing, rinsing, pretreatment, cleaning, sanitizing, preserving, etc. The velocity and volume of the gaseous phase can be determined to provide desired contact between the liquid phase and the membrane, resulting in desired contact or coverage of the membrane and/or any item on the membrane such as a foulant. This desired gaseous velocity and volume will depend on the membrane type, pore size, chemistry, diameter, length, and orientation of the membrane system.

The membranes that can be treated according to the invention include those membranes that are designed for periodic cleaning, and are often utilized in various applications requiring separation by filtration. Exemplary industries that utilize membranes that can be treated according to the invention include the food industry, the beverage industry, the biotechnology industry, the pharmaceutical industry, the chemical industry, and the water purification industry. In the case of the food and beverage industries, products including milk, whey, fruit juice, beer, and wine are often processed through a membrane for separation. The water purification industry often relies upon membranes for desalination, contaminant removal, and waste water treatment. An exemplary use of membranes in the chemical industry includes electropaint processes.

Multiple phase flow refers to the generally concurrent delivery of a liquid phase and a gaseous phase through a conduit. It should be understood that multiple phase flow refers to a media that contains a liquid phase and a gaseous phase. In general, multiple phase flow refers to a condition where the liquid phase is distributed or delivered by the gaseous phase. It should be understood that the phrase "generally concurrent delivery" refers to a generally steady state operation and is not intended to reflect a condition resulting from a transient start up of a conventional, liquid flow where there may be some initial mixing of gas with a liquid phase as a result of air being present in the lines, and is not intended to reflect a condition where there may be incidental bubbles present in a conventional, liquid flow.

Multiple phase flow can be used to provide advantages compared with liquid flow. It should be understood that the reference to liquid flow refers to the general absence of a gaseous phase that suspends and transports a liquid phase. Compared to liquid flow cleaning, multiple phase flow can be used to deliver a higher concentration of chemical agent to a surface to increase the efficacy of the chemical agent. In many applications, it is expected that it would be too costly to use a highly concentrated chemical agent in liquid flow compared with multiple phase flow to deliver the same concentration of chemical agent to a surface. It is expected that multiple phase flow can deliver a highly concentrated chemical to a surface without the waste associated with liquid flow. As a result, certain advantages resulting from the use of highly concentrated chemicals can be realized using multiple phase flow compared with liquid flow. In addition, by using the same amount of chemicals and/or active ingredients, a higher chemical concentration can be provided using multiple phase flow than liquid flow because the gaseous phase is the carrier or diluent in the multiple phase flow whereas water is typically the carrier or diluent in liquid flow. It is expected that multiple phase flow can use less chemistry and/or active ingredients than liquid flow because water is not the primary carrier for the concentrate. By using more concentrated chemistry that is compatible with the membrane, it is expected that multiple phase flow can provide a desired effect in less time and/or provide an enhanced effect compared with liquid flow. By treating (such as, cleaning) faster, it is possible to increase production rate by decreasing the down time of the separation facility. It is believed that multiple phase flow can provide an overall reduction in the amount of chemistry and/or active ingredients and water. It is expected that the use of multiple phase flow for treating membranes can result in increased membrane life compared with the use of liquid flow. For example, multiple phase flow may allow for the more effective use of enzymes for cleaning as an alternative to chlorine and/or high alkalinity solutions. The buffered enzymatic cleaning agent can be applied economically using the multiple phase flow while remaining within the pH, oxidant, and temperature compatibility limits of the membrane. A highly concentrated caustic or chlorine solution may exceed the pH and chlorine limits of the membrane causing premature membrane failure.

It should be understood that the use of the phrases liquid flow, single phase flow, and multiple phase flow are not intended to exclude the presence of solids that may be present intentionally and/or as a result of foulant or debris that may become a part of the system. In addition, liquid flow can be referred to as flooded flow, and multiple phase flow can be referred to as non-flooded flow.

Membranes that can be treated according to the invention include those provided in the form of spiral wound membranes, plate and frame membranes, tubular membranes, capillary membranes, hollow fiber membranes and the like. In the case of spiral wound membranes, it is expected that the industrial commonly available diameters of 3.8 inch, 6.2 inch, and 8.0 inch can be treated using multiple phase flow. The membranes can be generally characterized according to the size of the particles being filtered. Four common types of membrane types include microfiltration (MF) membranes, ultrafiltration (UF) membranes, nanofiltration (NF) membranes, and reverse osmosis (RO) membranes. Microfiltration membranes tend to block very fine heterogeneous particles and have pore sizes within the range of about 0.05 µm to about 10 µm. Microfiltration membranes can separate the largest macro molecules of proteins, separation of viruses, bacteria, and other microorganisms in the manufacture of artificial proteins, filtration of beer or wine, separation of various suspended substances, and removal of various kinds of turbidity. Ultrafiltration membranes have pore sizes within the range of about 0.02 µm to 0.1 µm and provide for separation of macro molecular substances with relative molecular mass within the range of about 1 kDa to about 1,000 kDa. An approximate theoretical size of a pore in nanofiltration membranes is about 0.02 µm or less for separation of polyvalent ions. In reverse osmosis, the pore size is theoretically about 0.002 µm or less and can remove a vast majority of monovalent ion substances from water. Because of the pore sizes, each membrane process operates at an optimal pressure. Microfiltration membrane systems generally operate at pressures less than about 30 psig. Ultrafiltration membrane systems generally operate at pressures of about 15-150 psig. Nanofiltration membrane systems generally operate at pressures of about 75-500 psig. Reverse osmosis membrane systems generally operate at pressures of about 200-2000 psig. Membranes can be formed from a variety of materials that are commonly used to form membranes including cellulose acetate, polyamide, polysulfone, vinylidene fluoride, acrylonitrile, stainless steel, ceramic, etc. These various membrane chemical types and other materials of construction may have specific pH, oxidant, solvent, chemical compatibility restrictions, and/or pressure limitations.

A general advantage to using multiple phase flow for treating membranes is the ability to deliver a relatively high concentration of a chemical or chemical agent to a membrane surface. In general, the chemical or chemical agent should be of a type that, when applied at a high concentration, remains compatible with the membrane and does not harm the membrane. In conventional techniques for cleaning, sanitizing, and preserving membranes that utilize a single phase flow of liquid, it is often not possible to achieve the concentration levels that can be achieved relatively easily by multiple phase flow. In addition, if it is possible to achieve the relatively high concentration levels in single phase flow, it is expected that the cost may be undesirable because of the large amounts of chemicals needed. When treating membranes using multiple phase flow, it is desirable to provide a sufficient amount of liquid phase so that the membrane remains wetted. It is expected that certain types of membranes will become inoperative or may age or become harmed if they are allowed to dry.

When referring to cleaning filtration membranes, it is often desirable to distinguish between physically clean membranes, chemically cleaned membranes, and biologically clean or sanitized membranes. Physically clean membranes refer to those that are free from visible impurities or foreign matter. Chemically cleaned membranes refer to those membranes where most foulants and impurities are removed. Biologically clean or sanitized membranes are free of all viable microorganisms. Industrial membrane systems require regular cleanings to remove foulants, restore production fluxes and reduce possibility of microbial contamination. A physically clean membrane refers to a membrane exhibiting a flux recovery of at least about 80%. The "flux recovery" refers to the measure of a permeate rate under conditions of pressure and temperature with a purified water source after cleaning compared with the pre-cleaned permeate rate. It should be understood that the flux of a membrane may irreversibly change over time as a result of processing conditions such as pressure and temperature, and physical changes such as swelling and shrinking of pores. In the case of a membrane that has been subjected to at least about 10 cycles of filtration and cleaning, it is expected that the flux recovery of a physically clean membrane will be at least about 80%.

Now referring to FIG. 1, an exemplary separation facility is shown at reference number 10. The separation facility 10 is an exemplary design for using ultrafiltration membranes for filtering dairy product such as whey and/or fermentation product such as that encountered in a beer brewing facility. It should be understood that various separation facilities that can be treated according to the principles of the invention may include structures similar to that shown in the separation facility 10 and may include more or less of the structures shown and may include different structures than those shown.

The separation facility 10 includes a plurality of separation stages 12, 14, 16, 18, and 20. The separation stages can be referred to as cross flow separation stages because they provide for separation across a membrane. It should be understood that other types of flow can be provided including dead end separation. Separation facilities that can be processed according to the invention include those having fewer separation stages and separation facilities having more separation stages than shown in FIG. 1.

Figure 2:
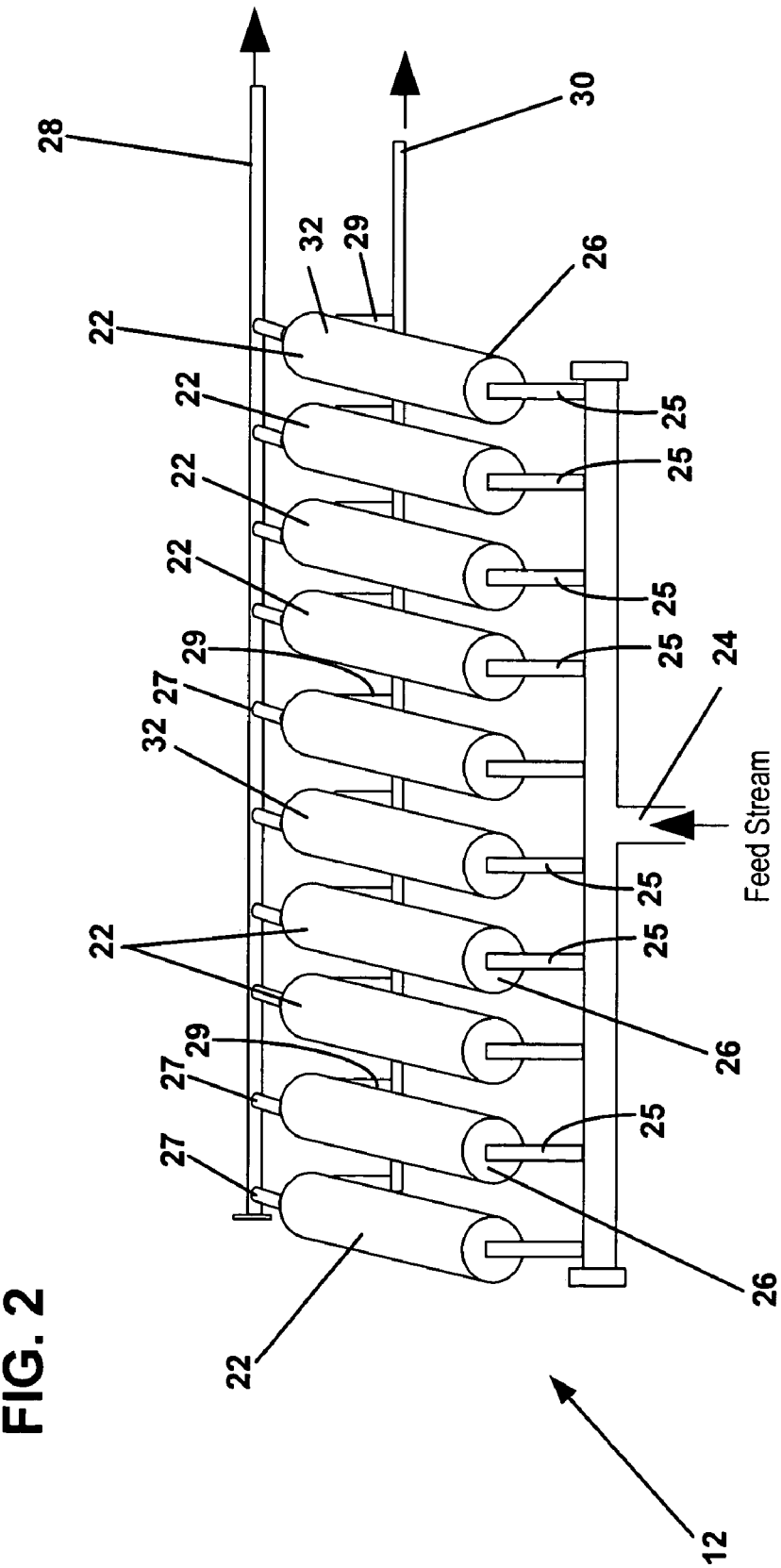
FIG. 2 is a diagram of an exemplary separation stage showing a plurality of separation vessels arranged in parallel.

The stage 12 is shown in FIG. 2 and includes a plurality of separation vessels 22 arranged in parallel. The vessels 22 include membranes therein. For the separation stage 12 shown in FIG. 2, 10 separation vessels 22 are shown wherein each separation vessel 22 includes 4 membranes. Accordingly, for the exemplary separation facility 10, there are 200 membranes for treatment assuming that the separation stages 14, 16, 18, and 20 are similar in structure to separation stage 12. A feed stream 24 is provided that distributes feed to the vessel feed stream 25 so that the feed enters a first end 26 of the vessels 22. A permeate is recovered from the vessel permeate streams 27 and collects in the permeate stream 28. Retentate is recovered in the vessel retentate streams 29 and collects in the retentate stream 30. In general, the permeate and the retentate are recovered from the second end 32 of the vessels 22. Although the feed stream 24, the permeate stream 28, and the retentate or concentrate stream 30 are described in the context of separation stage 12, it should be understood that each of the separation stages 14, 16, 18, and 20 can include a feed stream, a permeate stream, and a retentate or concentrate stream. It should be understood that for a given separation facility, the number of separation stages can vary, the number of separation vessels per separation stage can vary, and the number of membranes per separation vessel can vary.

Now referring again to FIG. 1, the separation facility 10 includes a feed tank 40 and a feed line 42 that delivers fluid to the separation stages 12, 14, 16, 18, and 20. The feed tank 40 can be provided for holding product intended to be separated via the separation facility 10. In addition, the feed tank 40 can be provided for holding cleaning chemicals for cleaning the separation facility 10. By providing the feed tank 40 with the ability to contain both product for separation and cleaning chemicals for cleaning, it is possible to decrease the number of tanks needed for holding product and cleaning chemicals. It should be understood, of course, that additional holding tanks can be provided for holding product for separation and cleaning chemicals. It should be understood that the separation facility 10 is provided for illustrative purposes only. It is expected that many separation facilities that can be processed according to the invention will include additional processing equipment or, possibly, less processing equipment. In order to illustrate the present invention, the separation facility 10 is shown where much of the processing equipment has multiple uses.

A feed line drain valve 44 can be provided for allowing fluid in the feed line to flow to the drain 46. A feed pump 48 can be provided to cause fluid to flow through the feed line 42. A flow meter 50 can be provided for evaluating the flow through the feed line 42, and prefilters 52 and 54 can be provided for removing relatively large particulates or contaminants from the fluid flowing through the feed line 42. A pressure gauge 49 can be provided for measuring the pressure in the feed line 42 downstream of the feed pump 48. Upstream and downstream prefilter valves 56 and 58 can be provided for turning on and off flow through the prefilters 52 and 54 to allow for cleaning of the prefilters 52 and 54. A control valve 60 can be provided for controlling flow through the feed line 42. A heat exchanger 59 can be provided for controlling the temperature of the feed.

Stage feed lines 62, 64, 66, 68, and 70 are provided for feeding fluid from the feed line 42 to the separation stages 12, 14, 16, 18, and 20, respectively. Booster pumps 72, 74, 76, 78, and 80 can be provided for boosting flow and pressure into the separation stages. Permeate recovery lines 82, 84, 86, 88, and 90 are provided for recovering the permeate from the separation stages and can be combined into a separation facility permeate line 92 that moves permeate to the permeate tank 94. The permeate tank 94 can be additionally provided for holding cleaning chemicals and/or collecting cleaning chemicals that have circulated through the separation facility 10. In addition, additional tanks can be provided for holding cleaning chemicals. A separation facility permeate line valve 95 can be provided for draining the separation facility permeate line 92 into the drain 97.

Pressure gauges 61, 63, 65, 67, and 69 can be used for measuring the pressure within in the stage feed lines 62, 64, 66, 68, and 70. In addition, flow meters 81, 83, 85, 87, and 89 can be provided for measuring flow through the permeate recovery lines 82, 84, 86, 88, and 90.

A permeate recovery line 98 can be provided for delivering permeate from the permeate tank 94 to the distribution plate 100. A permeate recovery line valve 99 can be provided for draining the permeate recovery line 98 to the drain 101. A permeate pump 102 can be provided for boosting flow through the permeate recovery line 98.

Retentate lines 112, 114, 116, 118, and 120 are provided for recovering retentate from the separation stages. The retentate can flow into the separation facility retentate line 122 and/or it can flow into the feed line 42 for further separation. It should be understood that the feed line 42 and the separation facility retentate line 122 can be part of a circulation loop for feeding the separation stages. A portion of the retentate can be recovered via the retentate recovery line 124. Retentate in the separation facility retentate line 122 can be recycled into the feed lines 62, 64, 66, 68, and 70. The retentate flowing through the retentate recovery line 124 can be recycled to the feed tank 40 via the retentate recycle line 123 or removed via the retentate removal line 126. It is expected that retentate recovered via the retentate removal line 126 can be sent to an evaporator for recovery of solids. The retentate recovery line 124 can include a flow meter 125 to identify flow rate through the retentate recovery line 124, a control valve 127 for controlling flow and concentration faster through the retentate recovery line 124, and a drain valve 129 to provide draining into the drain 128.

Retentate can flow from the retentate lines 112, 114, 116, 118, and 120 into the retentate drain lines 132, 134, 136, 138, and 140. Retentate line valves 142 can be provided for controlling the flow of retentate from the retentate lines 112, 114, 116, 118, and 120 into the separation facility retentate line 122. In addition, drain valves 144 can be provided for controlling flow of retentate from the retentate lines 112, 114, 116, 118, and 120 into the retentate drain lines 132, 134, 136, 138, and 140. Flow into the feed lines 62, 64, 66, 68, and 70 can be controlled by the feed line valves 146. It should be understood that the names given to the various lines and valves reflects the generally expected component flowing therethrough during separation. For certain stages, a feed for one stage may be considered a retentate from another stage. In addition, it should be understood that treatment compositions may flow through the lines.

The separation facility 10 is set up for filtering product, and then for cleaning the components of the separation facility by a single phase flow cleaning procedure. This type of cleaning is often referred to as CIP cleaning (Clean In Place). That is, cleaning liquid is circulated through the facility to provide the desired cleaning. It is expected that the separation facility 10 will alternate between filtering product and cleaning the components of the separation facility. During operation of the separation facility for filtering product, product for separation is received within the feed tank 40 and flows to the separation stages for separation into a permeate stream and a retentate stream. The permeate stream and the retentate stream can be further filtered, recycled, and/or recovered. As shown in FIG. 1, retentate can be recovered via the separation facility retentate line 122 and further filtered through any of the separation stages 12, 14, 16, 18, and 20. Retentate can be recovered via the retentate recovery line 124, returned to the feed tank 40 via the retentate recycle line 123 or removed via the retentate removal line 126. A retentate valve 121 can be provided for controlling flow of retentate into either the retentate removal line 126 or the retentate recycle line 123. The permeate can be recovered via the separation facility permeate line and collected in the permeate tank 94. The permeate can then flow through the permeate recovery line 98 and removed via the permeate removal line 93 or to the feed tank 40 via the feed line 95. Permeate recovered from the separation facility 10 can be further processed by, for example, reverse osmosis. The distribution plate 100 acts as a type of valving cluster to provide closed circulation within the separation facility 10.

During a typical liquid flow cleaning operation, the product can be removed by allowing the system to drain and/or by pushing product out using, for example, water. The product can be recovered or allowed to drain via any of the several drains. Water and cleaning chemistry can be introduced through the chemistry and water inlet line 170 and/or the water and chemistry inlet line 172. Valves 171 and 173 can be provided for controlling flow through the water and chemistry inlet lines 170 and 172. Accordingly, cleaning materials can be provided in the feed tank 40 and/or the permeate tank 94. It should be understood that additional tanks can be provided for containing the cleaning chemistry. However, it is expected that many separation facilities will achieve a savings in capital expense by collecting the cleaning chemicals in an existing tank. The cleaning chemistry can be circulated through the separation facility 10, and in particular through the separation stages 12, 14, 16, 18, and 20. Spray balls 174 and 176 can be provided for cleaning the feed tank 40 and the permeate tank 94, respectively. Spray ball lines 178 and 180 can be provided for allowing cleaning chemistry to flow into the spray balls 174 and 176, respectively. In addition, valves 182 and 184 can be provided for controlling flow into the spray balls 174 and 176. The distribution plate 100 can be adjusted to provide a closed loop during cleaning. That is, cleaning product flowing through the permeate recovery line 98 can be directed into the feed tank 40 via the product feed line 95. In addition, the valve 121 can be adjusted so that the cleaning product flowing through the retentate recovery line 124 flows into the feed tank 40 via the retentate recycle line 123. In addition, the remaining valves in the separation facility 10 can be adjusted to ensure that all the lines are adequately cleaned.

Conventional membrane cleaning techniques are available that utilize a series of steps to remove soil from a membrane as disclosed in Table 1. During the steps, chemistries, time, flows, temperature, and flow rates can be varied. Exemplary steps found in conventional membrane cleaning techniques include product displacement, a liquid rinse, a circulation of a liquid washing composition, a liquid rinse, a sanitizing or preserving application, and a liquid rinse. One or more of these steps can be replaced with a multiple phase flow. In the example of dairy membrane processing (milk, whey, etc.), typical soils may include lipids, proteins, minerals and carbohydrates. The circulation times, flow rates, chemistries, etc., for each step can be dependent upon the size of the membrane system, soil type, membrane type and the like.

TABLE 1

| Step | Chemistry | Temperature | Function |
|---|---|---|---|
| Product displacement | Water | Ambient | Displace processed product from membrane system |
| Pre-rinse | Water | Ambient | Loose soil removal |
| Alkaline wash | Caustic, enzymes, surfactants, chlorine and sequestrants | Hot | Lipid, protein, carbohydrate and mineral removal and soil suspension |
| Rinse | Water | Ambient | Rinsing of alkalinity |
| Acid wash | Nitric acid, phosphoric, citric, and surfactants | Hot | Mineral removal |
| Rinse | Water | Ambient | Rinsing of acidity |
| Alkaline wash | Caustic, enzymes, surfactants, chlorine and sequestrants | Hot | Lipid, protein, carbohydrate and mineral removal and soil suspension |
| Rinse | Water | Ambient | Rinsing of alkalinity |
| OPTIONAL STEPS | | | |
| Antimicrobial Treatment | Chlorine, peracetic acid, hydrogen peroxide | Ambient | Antimicrobial |
| Preservation | Sodium bisulfite, citric acid, lactic acid | Ambient | Minimize microbial growth |

The CIP program described in Table 2 is for an industrial polysulfone ultrafiltration membrane system designed to process whole whey from a cheese manufacturing process. The membrane system includes 5 stages, each having 10 vessels that each contain 4 membranes, each have the dimensions of 3.8 inch diameter by 38 inches long, and each contain 6.7 square meters of membrane area. The total membranes in the system is therefore 200 and the total membrane area is 1340 square meters. The total cleaning solution flow to each stage is approximately 300 gallons per minute. The total flow to each vessel is therefore approximately 30 gallons per minute. These flow rates allow for effective cross-flow velocity across the membrane thereby removing soil both by mechanical and chemical energy. In addition, pumps, valves, circuit lines and tanks are typically cleaned in series with the membranes and membrane holding vessels. The system is hydraulically flooded throughout the conventional cleaning cycle. The volume of solution used for the rinse steps is based upon the industry standard of using approximately 5 liters of cleaning solution for each square meter of membrane area. Similarly effective circulatory (recirculation) wash steps, provide about 3 liters of solution per square meter of membrane area. Therefore, in this example, wash steps provide a total solution volume of 2040 liters (1062 gallons) for adequate flooding, circulation and cleaning. Similarly, the rinse steps require a total solution to volume of 67000 liters (1770 gallons) for adequate rinsing). In this example the total water consumed is 14,869 gallons and the total wash time is 191 minutes or 3.2 hours.

TABLE 2

| Step | Chemistry | Temp | pH | Water Used | Time |
|---|---|---|---|---|---|
| Product Displacement | Water | Ambient | neutral | 1770 gal | 6 min |
| Rinse | Water | Ambient | neutral | 1770 gal | 6 min |
| Alkaline Wash + Heating | 0.50% Ultrasil 25* 0.05% Ultrasil 01 0.15% XY-12 | 122 deg F. | 11.0 | 1062 gal | 55 min |
| Rinse | Water | Ambient | neutral | 1770 gal | 6 min |
| Acid Wash + Heating | 0.30% Ultrasil 76* | 122 deg F. | 2.0 | 1062 gal | 40 min |
| Rinse | Water | Ambient | neutral | 1770 gal | 6 min |
| Alkaline Wash + Heating | 0.50% Ultrasil 25* 0.05% Ultrasil 01 0.15% XY-12 | 122 deg F. | 11.0 | 1062 gal | 55 min |
| Rinse | Water | Ambient | neutral | 1770 gal | 6 min |

*Available from Ecolab, Inc.

A typical polysulfone UF membrane can tolerate about 5000 ppm days of chlorine. Therefore, to obtain a useful life from the membrane and minimize premature chemical degradation, industries standards recommend using no more than abou 211 ppm sodium hypochlorite or 200 ppm as avilable chlorine and a pH of about 11.5 for daily single phase CIP cleaning regimes. Also, in the case of 4 inch diameter UF and RO membranes maximum presssure differentials can be about 15-20 psi drop per module. According to the example in Table 2, this particular UF membrane system provides about 1062 gallons during membrane treatment steps. An exemplary non-buffered alkaline cleaning composition that meets this criterion requires 4.4 pounds of NaOH (sodium hydroxide), 1.9 pounds of NaOCl (sodium hypochlorite), 1.8 pounds of water conditioner and 0.9 pounds of surfactant. At these dosage levels, a resulting use concentration for the individual components meets the criteria and limitations of single phase CIP cleaning of a polysulfone UF membrane system as follows:

| Single-Phase Alkaline Composition | Pounds | Use Concentration |
|---|---|---|
| NaOH | 4.4 | 500 ppm |
| NaOCl | 1.9 | 211 ppm |
| Water Conditioner | 1.8 | 200 ppm |
| Surfactant | 0.9 | 100 ppm |

An advantage of this invention is the ability use concentrated chemistries from about 2 to about 20 times typical conventional concentration levels when using multiple phase flow due to the lower volumes required for circulation. For further clarification of its usefulness, one can demonstrate that simply concentrating conventional single phase non-buffered CIP chemistry by for example 5 times requires a large amount of chemistry due to the large volume of solution required in a conventional flooded circulation mode. This is not economically feasible in most cases. In addition, simply concentrating non-buffered chemistry results in concentrations that are above recommended polysulfone UF membrane limitations such as pH and available chlorine as found in this example. Daily treatment at these high concentrations may prematurely degrade the membrane. It should be noted, that depending on the particular membrane material and materials of construction, many other membrane types have various chemical compatibility limitations and this examples is for illustrative purposes.

| Single-Phase Alkaline Composition | Pounds | 5X Use Concentration |
|---|---|---|
| NaOH | 22.1 | 2500 ppm |
| NaOCl | 9.3 | 1055 ppm |
| Water Conditioner | 8.8 | 1000 ppm |
| Surfactant | 4.4 | 500 ppm |

To describe the chemistry concentration factor available using this technology, it was determined from pilot plant testing that for multiple phase flow, one can use 20% of the total membrane treatment solution as compared to conventional flooded single phase CIP flow. For conventional flow the total solution volume required is 21.2 gallons while using multiple phase flow, it was determined that 4 gallons of solution could be adequately circulated. Extrapolating these figures to the above industrial UF plant allows for a total volume of 212 gallons for multiple phase flow as compared to 1062 gallons for conventional single phase flow. Using 20% of the total solution allows for a minimum of five times the concentration of chemistry at equal cost. This value was determined on a pilot system that contained four UF membranes measuring 3.8 inch by 38 inch membranes. The modules were in series and housed in a 4 inch diameter membrane vessel. The multiple phase flow conditions included an air flow of 14 psig and 20 scfm (standard cubic feet per minute) and a liquid flow rate of 1.8 gpm. These conditions resulted in an air to liquid ratio of about 42:1 to 81:1 and a calculated velocity of about 2.6-5.0 feet per second. Using these conditions and concentration factors, a concentrated composition can be constructed that is economically feasible and while remaining within the chemical limitations of the membrane. In this case, an alkaline composition contains a buffering system, proteolytic enzymes, water conditioners and a surfactants resulting in a pH of about 9.0 to 10.0. It is therefore disclosed that an acidic, alkaline or neutral buffered systems containing water conditioners, surfactants, solvents and/or enzymes and combinations thereof can be used for effective membrane treatments depending upon the intended effect such as fat, protein and/or mineral reaction and removal.

| Multiple Phase Alkaline Composition | Pounds | Use Concentration |
|---|---|---|
| NaOH | 4.4 | 2500 ppm |
| Gluconic Acid | 5.1 | 2890 ppm |

-continued

| Multiple Phase Alkaline Composition | Pounds | Use Concentration |
|---|---|---|
| Sodium Carbonate | 3.6 | 2029 ppm |
| Proteolytic Enzyme (proteolytic activity of 2.5 au/g) | 2.5 | 1393 ppm |
| Water Conditioner | 4.4 | 2500 ppm |
| Surfactant | 0.9 | 500 ppm |

Again, it should be noted that simply concentrating conventional chemistry may result in a use solution that exceeds the membranes chemical limitations. Therefore, concentrated compositions used in this invention must be compatible with the particular membranes being treated. Examples for concentrated chemical compositions may include alkaline, acidic and neutral buffering systems, enzyme systems, compatible surfactants and compatible solvents. The ability to use non-aqueous systems economically is a particular advantage to this invention since conventional volumes would be too costly in most industrial applications.

Figure 3:
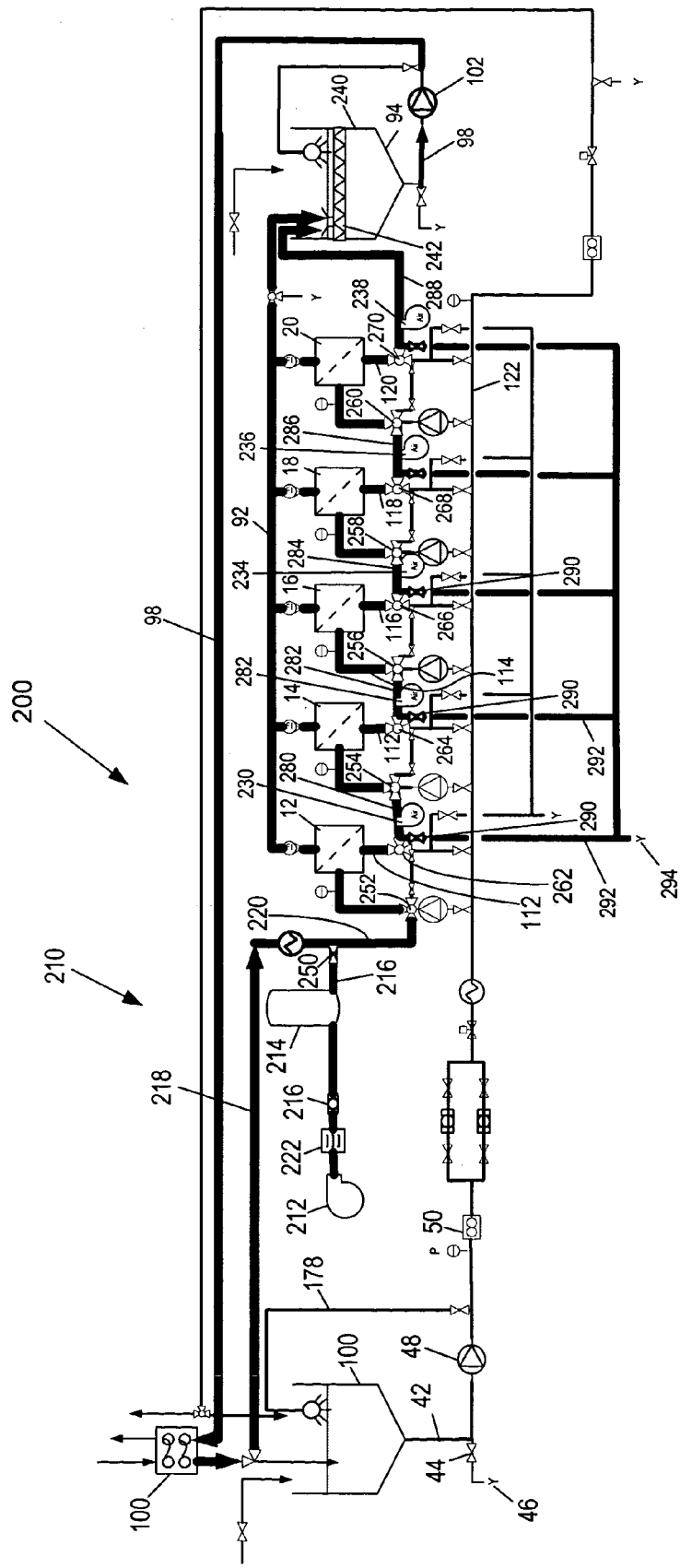
FIG. 3 is a diagram of the separation facility of FIG. 1 modified to provide for multiple phase flow.

Now referring to FIG. 3, a separation facility 200 is shown configured for providing multiple phase flow according to the invention. The separation facility 200 is similar to the separation facility 100 except that it has been adapted or retrofit for multiple phase flow. It is expected that existing separation facilities can be modified and/or retrofit to provide for multiple phase treatment according to the invention. It should be understood that new separation facilities can be prepared that include equipment for providing multiple phase flow according to the invention.

The separation facility 200 can be characterized as a separation facility with a hybrid CIP system. In this context, the term "hybrid" refers to an ability to provide both multiple phase flow and single phase flow during the membrane treatment cycles. It is expected that certain components will be treated with single phase flow, and other components will be treated with multiple phase flow. In addition, it is expected that certain equipment will be treated with both multiple phase flow and single phase flow. The hybrid equipment design of this invention allows the use of multiple phase flow for specific treatment of the membranes while eliminating the drawbacks of multiple phase flow through equipment such as pumps and tanks where multiple phase flow cannot be delivered effectively. For example, most separation system pumps require flooded hydraulic conditions and cannot properly function and/or pump a multiple phase solution. In other words, the hybrid equipment design allows the segregation of certain equipment to be cleaned using multiple phase flow and other equipment to be treated using conventional single phase flooded flow. The cleaning challenges of a separation facility are the membranes and not necessarily the remaining pumps, tanks and piping. Therefore, the hybrid design allows for multiple phase flow to be utilized on the difficult to treat membranes thereby offering the greatest benefit for the technology such as reduced cleaning times, the use of concentrated chemistries and the use of less total solution volumes. In addition, the hybrid equipment design allows the membranes to be treated using both multiple phase flow and single phase flow for additional benefit. Such a treatment could be delivery of a concentrated solution using multiple phase flow, a soaking step with no flow and a final single phase flow in which the system is flooded and allowed circulate and dilute the original concentrated solution.

The separation facility 200 includes the structure of the separation facility 10 and additionally includes multiple phase flow generating equipment 210. The lines through which multiple phase flow can be provided are shown in bold. In general, the multiple phase flow equipment include a compressor 212, an air receiver 214, gas phase delivery line 216, treatment agent delivery line 218, and multiple phase delivery line 220. Accordingly, air flowing through the gas phase delivery line 216 combines with the treatment agent flowing through the treatment agent delivery line 218, and the multiple phase composition flows through the multiple phase delivery line 220. The multiple phase flow equipment 210 can additionally include an air purifier 222, and booster compressors 230, 232, 234, 236, and 238. Air purification may be useful for food, beverage and pharmaceutical separation facilities to minimize contamination of food, beverage or drug type products. In general, the booster compressors 230, 232, 234, and 236 can be provided to help provide flow through the separation stages 14, 16, 18, and 20.

The multiple phase flow equipment 210 can additionally includes a multiple phase tank 240. The multiple phase tank 240 can be a modified version of the permeate tank 94. That is, the permeate tank 94 can be modified to include a screen 242 that helps pull the liquid phase out of the multiple phase treatment composition and allows a liquid phase to settle at the bottom of the permeate tank 94. The multiple phase tank 240 can be referred to as a demister and provides an ability to recirculate the liquid phase by taking the liquid phase out of the multiple phase composition. In addition, the demister helps remove the liquid phase from the multiple phase composition to help reduce the presence of aerosols in the atmosphere. In general, the screen 242 provides increased surface area that allows the liquid phase to condense. In addition, the gaseous phase can separate off by venting the permeate tank 94. The liquid collected in the permeate tank 94 can then be returned via the permeate line 98 and recycled through the distribution plate 100 to the treatment agent delivery line 218.

The multiple phase flow equipment 210 can additionally include valving to control the delivery of multiple phase composition in the desired regions of the separation facility 200. The gas valve 250 controls flow of gas or air into the multiple phase delivery line 220. The separation stage distribution valves 252, 254, 256, 258, and 260 control flow of multiple phase composition into the separation stages 12, 14, 16, 18, and 20. The retentate distribution valves 262, 264, 266, 268, and 270 are provided for controlling the flow of retentate to the retentate processing lines 280, 282, 284, 286, and 288, or to the separation facility retentate line 122. Accordingly, the retentate processing line 280 provides retentate for the booster pump 230 to create multiple phase flow for flow into the separation stage 14. In addition, valves 290 are available for allowing the retentate to flow into a retentate drain line 292 for draining into the drain 294.

The treatment composition that flows through the membrane can collect in the permeate line 92. Treatment composition that is recovered as retentate can be used for cleaning the subsequent separation stage. For example, treatment composition recovered in the retentate line 112 can be used for cleaning the separation stage 14, and treatment composition recovered in the retentate line 114 is used for treating the separation stage 16, and treatment composition recovered in the retentate line 116 is used for treating the separation stage 18, and treatment composition recovered in the retentate line 118 can be used for treating the separation stage 20. Treatment composition recovered in the retentate line 120 can be sent to the demister 240 for recovery of the treatment agent.

In general, the separation facility 200 provides for using multiple phase flow for treating the separation stages 12, 14, 16, 18, and 20. The remaining equipment and components of the separation facility 200 can be cleaned by conventional, liquid flow as described above. In addition, it is expected that conventional, liquid flow can be used to additionally treat the separation stages 12, 14, 16, 18, and 20. For example, it may be advantageous to place a concentrated treated composition on the membrane, possibly allow the treatment composition to soak on the membrane, and then have a liquid phase flow for recirculation across the membrane.

Figure 4:
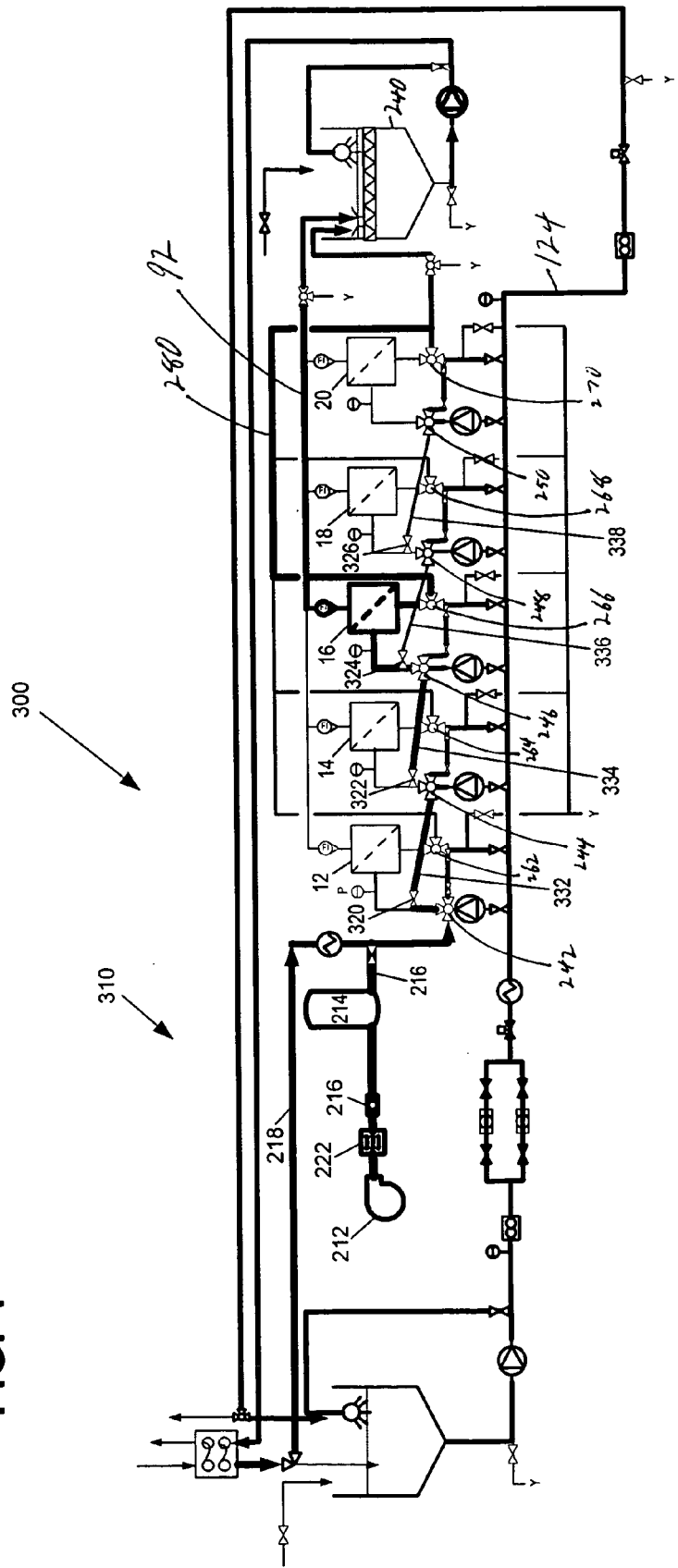
FIG. 4 is a diagram of the separation facility of FIG. 1 modified to provide for multiple phase flow.

Now referring to FIG. 4, a separation facility equipped to provide for multiple phase flow is shown at reference number 300. The separation facility 300 includes many of the same components or structures as the separation facility 200. The separation facility 300 is constructed to provide isolated treatment of particular separation stages by multiple phase flow. Whereas separation facility 200 provides for treatment of separation stages 12, 14, 16, 18, and 20 at the same time, the separation facility 300 is equipped to provide sequential treatment of the separation stages 12, 14, 16, 18, and 20. If one considers that the bold lines in FIG. 4 represent multiple phase flow at a particular point in time, it is apparent that separation stage 16 is being treated by multiple phase flow.

The separation facility 300 includes a multiple phase flow equipment 310. The multiple phase flow equipment 310 includes many of the same components identified above with respect to multiple phase flow equipment 210. The multiple phase flow equipment 310 include bypass valves 320, 322, 324, and 326 for diverting multiple phase flow through diversion lines 332, 334, 336, and 338. The diversion line 332 allows the multiple phase flow to bypass the separation stage 12, the diversion line 334 allows the multiple phase flow to bypass the separation stage 14, the diversion line 336 allows the multiple phase flow to bypass the separation stage 16, and the diversion line 338 allows the multiple phase flow to bypass the separation stage 18. The feed valves 242, 244, 246, 248 and 250 are provided for directing flow off feed and/or multiple phase treatment composition to the separation stages 12, 14, 16, 18, and 20. The retentate valves 262, 264, 268, 269 and 270 are provided for directing retentate to the retentate line 124 or directing treatment composition to the treatment composition recovery line 280. It should be understood that treatment composition passing through the membrane can travel via the permeate recovery line 92 to the demister 240. By providing a design that allows for by passing certain separate stages, one can avoid using booster pumps.

The CIP program discussed in Table 3 demonstrates an exemplary the use of multiple phase flow along with conventional flow and compositions in an industrial ultrafiltration membrane system specifically designed to allow for this type of cleaning to occur. The example illustrates the extrapolation of the smaller lab membrane system details to a large industrial system. The industrial system hybrid design allows for segregation of the membrane vessels from the rest of the membrane equipment including pumps, lines, and tanks for improving the CIP cleaning program and increasing the functionality and benefit of using multiple phase flow only on the critical and difficult to treat areas. The membranes and vessels are to be cleaned using multiple phase flow and concentrated chemistry, whereas the remaining equipment is cleaned using conventional hydraulically flooded flow. It is believed that the combination of the new membrane equipment design, multiple phase/conventional flow hybrid and concentrated chemistry, that this would allow for reduced cleaning times and reduced water usage. Based upon these extrapolations, the total water consumed is 8,351 gallons and the total cleaning time is 150 minutes. This represents a 44% decrease in water consumed and a 21% decrease in cleaning time. In addition, because of the hybrid equipment design, it is expected that the total chemistry consumption will be less.

TABLE 3

| Step | Chemistry | Temp | pH | Multiple Phase Flow Membranes/Vessels | | Conventional Flow Lines, Pumps, etc. | |
|---|---|---|---|---|---|---|---|
| | | | | Water Used | Time | Water Used | Time |
| Product Displacement | Water | Ambient | neutral | 110 gal | 6 min | 884 gal | 3 min |
| Rinse | Water | Ambient | neutral | 110 | 6 | 884 | 3 |
| Alkaline Wash + Heating | 5× concentrated Buffered Chemistry | 122 deg F. | 9–11 | 66 | 40 | 530 | 29 |
| Rinse | Water | Ambient | neutral | 110 | 6 | 884 | 3 |
| Acid Wash + Heating | 5× concentrated Buffered Chemistry | 122 deg F. | 2–3 | 66 | 29 | 530 | 20 |
| Rinse | Water | Ambient | neutral | 110 | 6 | 884 | 3 |
| Alkaline Wash + Heating | 5× concentrated Buffered Chemistry | 122 deg F. | 9–11 | 66 | 40 | 530 | 29 |
| Rinse | Water | Ambient | neutral | 110 | 6 | 884 | 3 |
| Antimicrobial Treatment | Oxonia Active | Ambient | 3–4 | 66 | 5 | 530 | |
| Rinse | Potable Water | Ambient | neutral | 110 | 6 | 884 | |

Multiple Phase Treatment Composition

The multiple phase treatment composition refers to the composition that includes a gaseous phase and a liquid phase, and wherein the gaseous phase is provided for delivery of the liquid phase to a surface. The multiple phase treatment composition can additionally include a solid phase that is provided within the liquid phase, within the gaseous phase, or within a combination of the liquid phase and the gaseous phase. The multiple phase treatment composition can be referred to as the composition in the context of a multiple phase flow system.

The gaseous phase can include air, carbon dioxide, ozone, nitrogen, water, etc. In most applications, it is expected that the gaseous phase will include air because the use of air is less expensive than many other gases. In addition, it is expected that the gaseous phase will be purified in order to remove contaminants such as particulates, bacteria, oil, etc. In addition, it is expected that mixtures of gases can be used. For example, it may be advantageous to use a mixture of air and carbon dioxide and/or ozone. The liquid phase and/or solid phase can include any components that would provide treating by, for example, flushing, rinsing, pretreatment, cleaning, sanitizing or preserving when applied to a membrane surface. In addition, the liquid and/or solid phase could be aqueous or non-aqueous in nature.

The gaseous phase should have a sufficient velocity to provide adequate coverage of liquid phase in the membrane for a desired treatment. The gaseous velocity, pressure, and volume can be selected depending on the properties of the membrane including the membrane chemistry, pore size, diameter, length, orientation (vertical or horizontal), and arrangement within a vessel, and depending on the gaseous composition and the liquid composition being transported. In general, it is desirable for the gaseous velocity, pressure, and volume to be sufficient to transport the liquid phase as a multiple phase composition. That is, it is generally desirable to keep the liquid phase suspended in the gaseous phase to provide desired coverage for application of the liquid phase to the surface to be treated. In addition, it is expected that a gaseous velocity, pressure, and volume that is too high may adversely affect delivering the liquid phase to the surface to be treated and may adversely affect the membrane. In order to provide consistent coverage and/or cross flow, it may be desirable to keep the gaseous phase velocity, pressure, and volume so that it stays below the bubble point of the membrane according to ASTM F 316-03. In general, the bubble point test is performed by pre-wetting a membrane, increasing the pressure of gas upstream of the membrane at a predetermined weight rate and watching for gas bubbles downstream to indicate the passage of gas through the maximum diameter pore. The pressure required to blow the first continuous bubbles detectable by the rise through a layer of liquid covering the membrane is called the "bubble point." It may be desirable to operate the multiple phase treatment below the bubble point of the membrane to control flow in the membrane. It is expected that cross flow can be maximized by keeping the conditions below the bubble point pressure of the membrane and thereby maximize treatment of the membrane surface. However, to maximize permeation, the gaseous pressure can be elevated above the bubble point of the membrane. In most applications, however, it is expected that it will be advantageous to remain below the bubble point to minimize permeation. In addition, it should be understood that the pressure drop across a membrane should be below manufacturer specification to minimize membrane compaction and irreversible damage. In addition, it should be understood that reference to "cross flow" in the context of a membrane refers to flow tangential to the membrane.

One skilled in the art would understand that the gas to liquid volume ratio can be controlled to provide adequate delivery of the treatment composition. For example, in the case of a 4 inch diameter membrane vessel that is housing four 38 inch ultrafiltration membranes, a desired gaseous volume determined at the inlet can range from about 10 to about 1,000 SCFM (standard cubic foot per minute) with a theoretical velocity of about 1 ft/sec. to about 200 ft/sec. based upon the gaseous volume and cross sectional area of the pipe vessel and membrane cross sectional area. The liquid injection rate for the multiple phase flow can range from about 0.1 gal/min. to about 15 gal/min. Using these gas and liquid rates, an effective gas to liquid volume ratio for multiple phase flow could be in the range of gas:liquid at about 5:1 to about 75,000:1.

The treatment composition can include a surfactant or surfactant mixture that can include at least one of water-soluble or water dispersible nonionic, semi-polar nonionic, anionic, cationic, amphoteric, or zwitterionic surface-active agents, or any combinations or mixtures thereof. The particular surfactant or surfactant mixture chosen for treating membranes can depend on a number of factors including tendency to foam or not foam, usefulness at the use pH, usefulness at the use temperature, and soil type. It is desirable to utilize surfactants that do not harm the membrane and/or the membrane functionality. Typically, anionic and some nonionic surfactants are compatible with most membranes although compatibility testing may be desired to select the surfactants and other components to maintain the longevity of the membranes.

One advantage of the present invention is the ability to deliver a high concentration of a particular chemistry to a membrane to provide a desired effect. It is expected that using liquid flow to achieve the concentrations that can be provided by multiple phase flow may be too cost prohibitive. Accordingly, it is expected that there is very little literature describing the effect of highly concentrated compositions, such as those concentrations that can be relatively easily obtained as a result of multiple phase flow, on various filtration membranes. Accordingly, one would likely want to test compatibility at the intended use concentration level while also considering the pH, temperature, and length of contact. As an example, an ultrafiltration polysulfone membrane may have typical restrictions including a pH range of 2-11 and a temperature of less than about 130° F. Accordingly, one may wish to maintain the concentrated chemistry for concentrated application to the membrane within these restrictions. For example, a concentrated buffered enzyme composition having a pH of about 9.5 has been found to work well with this type of ultrafiltration polysulfone membrane.

A listing of the classes and species of surfactants useful herein appears in U.S. Pat. No. 3,664,961 issued May 23, 1972, to Norris, the disclosure being incorporated herein by reference as exemplary surfactants that can be used.

Anionic Surfactants

It is expected that anionic surfactants can be useful according to the invention. Anionic surfactants are surface active substances having a negative charge on the hydrophobe or have a hydrophobic section that carries no charge unless the pH is elevated to neutrality or above (e.g. carboxylic acids). Carboxylate, sulfonate, sulfate, and phosphate are the polar (hydrophilic) solubilizing groups found in anionic surfactants. Of the cations (counter ions) associated with these polar groups, sodium, lithium, and potassium impart water solubility; ammonium and substituted ammonium ions provide both water and oil solubility; and, calcium, barium, and magnesium promote oil solubility.

Anionics can be useful additives to compositions of the present invention. Anionic surface active compounds can be useful to impart special chemical or physical properties other than detergency within the composition. Anionics can be employed as gelling agents or as part of a gelling or thickening system. Anionics are excellent solubilizers and can be used for hydrotropic effect and cloud point control.

The majority of large volume commercial anionic surfactants can be subdivided into five major chemical classes and additional sub-groups known to those of skill in the art and described in "Surfactant Encyclopedia", *Cosmetics & Toiletries*, Vol. 104 (2) 71-86 (1989). The first class includes acylamino acids (and salts), such as acylgluamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Further examples of suitable anionic surfactants are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at column 23, line 58 through column 29, line 23. The disclosures of the above references relating to anionic surfactants are incorporated herein by reference.

Nonionic Surfactant

Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Nonionic surfactants that may be useful in the present invention include:

1. Block polyoxypropylene-polyoxyethylene polymeric compounds such as Pluronic® and Tetronic® manufactured by BASF Corp.
2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide such as Igepal® manufactured by Rhone-Poulenc and Triton® manufactured by Union Carbide.
3. Condensation products of one mole of a saturated or unsaturated, straight or branched chain alcohol having from about 6 to about 24 carbon atoms with from about 3 to about 50 moles of ethylene oxide such as Neodol® manufactured by Shell Chemical Co. and Alfonic® manufactured by Vista Chemical Co.
4. Condensation products of one mole of saturated or unsaturated, straight or branched chain carboxylic acid having from about 8 to about 18 carbon atoms with from about 6 to about 50 moles of ethylene oxide such as Nopalcol® manufactured by Henkel Corporation and Lipopeg® manufactured by Lipo Chemicals, Inc.
5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule such as Pluronic® R surfactants manufactured by BASF.
6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof.
7. The alkylphenoxypolyethoxyalkanols of U.S. Pat. No. 2,903,486 issued Sep. 8, 1959 to Brown et al.
8. Polyhydroxy fatty acid amide surfactants.
9. The alkyl ethoxylate condensation products of aliphatic alcohols
10. The ethoxylated $C_6$-$C_{18}$ fatty alcohols and $C_6$-$C_{18}$ mixed ethoxylated and propoxylated fatty alcohols.
11. Suitable nonionic alkylpolysaccharide surfactants, particularly for use in the present compositions include those disclosed in U.S. Pat. No. 4,565,647, Llenado, issued Jan. 21, 1986.
12. Fatty acid amide surfactants.
13. A useful class of non-ionic surfactants include the class defined as alkoxylated amines or, most particularly, alcohol alkoxylated/aminated/alkoxylated surfactants.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds that may be available in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). The disclosures of these references relating to nonionic surfactants are incorporated herein by reference.

Semi-Polar Nonionic Surfactants

The semi-polar type of nonionic surface active agents are another class of nonionic surfactant that may be useful in compositions of the present invention. The semi-polar nonionic surfactants include the amine oxides, phosphine oxides, sulfoxides and their alkoxylated derivatives.

Cationic Surfactants

Cationic surfactants may be useful according to the present invention. Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y− and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants can refer to compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like. The disclosures of cationic surfactants in the above references are incorporated herein by reference.

Amphoteric Surfactants

Amphoteric surfactants can be useful according to the present invention. Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). The disclosures of amphoteric surfactants in the above-identified references are incorporated herein by reference.

Zwitterionic Surfactants

It is expected that zwitterionic surfactants can be used according to the invention. Zwitterionic surfactants can be thought of as a subset of the amphoteric surfactants. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). The disclosures of zwitterionic surfactants in the above references are incorporated herein by reference.

Surfactant Compositions

The surfactants described hereinabove can be used singly or in combination in the practice and utility of the present invention. In particular, the nonionics and anionics can be used in combination. The semi-polar nonionic, cationic, amphoteric and zwitterionic surfactants can be employed in combination with nonionics or anionics. The above examples are merely specific illustrations of the numerous surfactants which can find application within the scope of this invention. It should be understood that the selection of particular surfactants or combinations of surfactants can be based on a number of factors including compatibility with the membrane at the intended use concentration and the intended environmental conditions including temperature and pH. Accordingly, one should understand that surfactants that may damage a particular membrane during conditions of use should not be used with that membrane. It is expected that the same surfactant, however, may be useful with other types of membranes. In addition, the level and degree of foaming under the conditions of use and in subsequent recovery of the composition can be a factor for selecting particular surfactants and mixtures of surfactants. For examples, in certain applications it may be desirable to minimize foaming and, as a result, one would select a surfactant or mixture of surfactants that provides reduced foaming. In addition, it may be desirable to select a surfactant or a mixture of surfactants that exhibits a foam that breaks down relatively quickly so that the composition can be recovered and reused with an acceptable amount of down time. In addition, the surfactant or mixture of surfactants can be selected depending upon the particular soil that is encountered.

It should be understood that the treatment composition need not include a surfactant or a surfactant mixture, and can include other components. In addition, the treatment composition can include a surfactant or surfactant mixture in combination with other components. Exemplary other components that can be provided within the treatment composition include builders, water conditioning agents, non-aqueous components, adjuvants, enzymes, and pH adjusting agents.

Builders

Builders are substances that augment the detersive effects of detergents or surfactants and supply alkalinity to the cleaning solution. Builders have the detersive properties of promoting the separation of soil from surfaces and keeping detached soil suspended in the detersive solution to retard redeposition. Builders may of themselves be precipitating, sequestrating or dispersing agents for water hardness control; however, the builder effect is independent of its water conditioning properties. Although there is functional overlap, builders and water conditioning agents having utility in this invention will be treated separately.

Builders and builder salts can be inorganic or organic in nature and can be selected from a wide variety of detersive, water soluble, alkaline compounds known in the art. Water soluble inorganic alkaline builder salts which can be used alone in the present invention or in admixture with other builders include, but are not limited to, alkali metal or ammonia or substituted ammonium salts of carbonates, silicates, phosphates and polyphosphates, and borates. Water soluble organic alkaline builders which are useful in the present invention include alkanolamines and cyclic amines.

Water Conditioning Agent

Water conditioning agents function to inactivate water hardness and prevent calcium and magnesium ions from interacting with soils, surfactants, carbonate and hydroxide. Water conditioning agents therefore improve detergency and prevent long term effects such as insoluble soil redepositions, mineral scales and mixtures thereof. Water conditioning can be achieved by different mechanisms including sequestration, precipitation, ion-exchange and dispersion (threshold effect).

The water conditioning agents which can be used include inorganic water soluble water conditioning agents, inorganic water insoluble water conditioning agents, organic water soluble conditioning agents, and organic water insoluble water conditioning agents. Exemplary inorganic water soluble water conditioning agents include all physical forms of alkali metal, ammonium and substituted ammonium salts of carbonate, bicarbonate and sesquicarbonate; pyrophosphates, and condensed polyphosphates such as tripolyphosphate, trimetaphosphate and ring open derivatives; and, glassy polymeric metaphosphates of general structure $M_{n+2}P_nO_{3n+1}$ having a degree of polymerization n of from about 6 to about 21 in anhydrous or hydrated forms; and, mixtures thereof. Exemplary inorganic water insoluble water conditioning agents include aluminosilicate builders. Exemplary water soluble water conditioning agents include aminopolyacetates, polyphosphonates, aminopolyphosphonates, short chain carboxylates and polycarboxylates. Organic water soluble water conditioning agents useful in the compositions of the present invention include aminpolyacetates, polyphosphonates, aminopolyphosphonates, short chain carboxylates and a wide variety of polycarboxylate compounds.

Aminopolyacetate water conditioning salts suitable for use herein include the sodium, potassium lithium, ammonium, and substituted ammonium salts of the following acids: ethylenediaminetetraacetic acid, N-(2-hydroxyethyl)-ethylenediamine triacetic acid, N-(2-hydroxyethyl)-nitrilodiacetic acid, diethylenetriaminepentaacetic acid, 1,2-diaminocyclohexanetetracetic acid and nitrilotriacetic acid; and, mixtures thereof. Polyphosphonates useful herein specifically include the sodium, lithium and potassium salts of ethylene diphosphonic acid; sodium, lithium and potassium salts of ethane-1-hydroxy-1,1-diphosphonic acid and sodium lithium, potassium, ammonium and substituted ammonium salts of ethane-2-carboxy-1,1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3-tetraphosphonic acid propane-1,1,2,3-tetraphophonic acid and propane 1,2,2,3-tetraphosphonic acid; and mixtures thereof. Examples of these polyphosphonic compounds are disclosed in British Pat. No. 1,026,366. For more examples see U.S. Pat. No. 3,213,030 to Diehl issued Oct. 19, 1965 and U.S. Pat. No. 2,599,807 to Bersworth issued Jun. 10, 1952. Aminopolyphosphonate compounds are excellent water conditioning agents and may be advantageously used in the present invention. Suitable examples include soluble salts, e.g. sodium, lithium or potassium salts, of diethylene thiamine pentamethylene phosphonic acid, ethylene diamine tetramethylene phosphonic acid, hexamethylenediamine tetramethylene phosphonic acid, and nitrilotrimethylene phosphonic acid; and, mixtures thereof. Water soluble short chain carboxylic acid salts constitute another class of water conditioner for use herein. Examples include citric acid, gluconic acid and phytic acid. Preferred salts are prepared from alkali metal ions such as sodium, potassium, lithium and from ammonium and substituted ammonium. Suitable water soluble polycarboxylate water conditioners for this invention include the various ether polycarboxylates, polyacetal, polycarboxylates, epoxy polycarboxylates, and aliphatic-, cycloalkane- and aromatic polycarboxylates Non-Aqueous Components These include the higher glycols, polyglycols, polyoxides, glycol ethers, aliphatic hydrocarbons, aromatic hydrocarbons, alcohols, etc.

Optional Adjuvants

In addition, various other additives or adjuvants may be present in compositions of the present invention to provide additional desired properties, either of form, functional or aesthetic nature, for example:

a) Solubilizing intermediaries called hydrotropes can be present in the compositions of the invention of such as xylene-, toluene-, or cumene sulfonate; or n-octane sulfonate; or their sodium-, potassium- or ammonium salts or as salts of organic ammonium bases. Also commonly used are polyols containing only carbon, hydrogen and oxygen atoms. They preferably contain from about 2 to about 6 carbon atoms and from about 2 to about 6 hydroxy groups. Examples include 1,2-propanediol, 1,2-butanediol, hexylene glycol, glycerol, sorbitol, mannitol, and glucose.

b) Nonaqueous liquid carrier or solvents can be used for varying compositions of the present invention.

c) Viscosity modifiers may be added to the invention. These may include natural polysaccharides such as xanthan gum, carrageenan and the like; or cellulosic type thickeners such as carboxymethyl cellulose, and hydroxymethyl-, hydroxyethyl-, and hydroxypropyl cellulose; or, polycarboxylate thickeners such as high molecular weight polyacrylates or carboxyvinyl polymers and copolymers; or, naturally occurring and synthetic clays; and finely divided fumed or precipitated silica, to list a few.

d) Solidifiers may be used to prepare solid form of the composition, and the resulting liquid can be formed therefrom. These could include any organic or inorganic solid compound having a neutral inert character or making a functional, stabilizing or detersive contribution to the intended embodiment. Examples are polyethylene glycols or polypropylene glycols having molecular weight of from about 1,400 to about 30,000; and urea.

A wide variety of other ingredients useful in detergent compositions can be included in the compositions hereof, including other active ingredients, carriers, draining promoting agents, manufacturing processing aids, corrosion inhibitors, antimicrobial preserving agents, buffers, tracers, inert fillers, dyes, pH adjusting agents, etc.

Enzymes

Enzymes can be used to catalyze and facilitate organic and inorganic reactions. It is well known, for example, that enzymes are used in metabolic reactions occurring in animal and plant life.

The enzymes that can be used according to the invention include simple proteins or conjugated proteins produced by living organisms and functioning as biochemical catalysts which, in detergent technology, degrade or alter one or more types of soil residues encountered on food process equipment surfaces thus removing the soil or making the soil more removable by the detergent-cleaning system. Both degradation and alteration of soil residues improve detergency by reducing the physicochemical forces which bind the soil to the surface being cleaned, i.e. the soil becomes more water soluble. The enzyme may be functional in either the acidic, neutral or alkaline pH range.

As defined in the art, enzymes are referred to as simple proteins when they require only their protein structures for catalytic activity. Enzymes are described as conjugated proteins if they require a non-protein component for activity, termed cofactor, which is a metal or an organic biomolecule often referred to as a coenzyme. Cofactors are not involved in the catalytic events of enzyme function. Rather, their role seems to be one of maintaining the enzyme in an active configuration. As used herein, enzyme activity refers to the ability of an enzyme to perform the desired catalytic function of soil degradation or alteration; and, enzyme stability pertains to the ability of an enzyme to remain or to be maintained in the active state.

Enzymes are extremely effective catalysts. In practice, very small amounts will accelerate the rate of soil degradation and soil alteration reactions without themselves being consumed in the process. Enzymes also have substrate (soil) specificity which determines the breadth of its catalytic effect. Some enzymes interact with only one specific substrate molecule (absolute specificity); whereas, other enzymes have broad specificity and catalyze reactions on a family of structurally similar molecules (group specificity).

Enzymes exhibit catalytic activity by virtue of three general characteristics: the formation of a noncovalent complex with the substrate, substrate specificity, and catalytic rate. Many compounds may bind to an enzyme, but only certain types will lead to subsequent reaction. The later are called substrates and satisfy the particular enzyme specificity requirement. Materials that bind but do not thereupon chemically react can affect the enzymatic reaction either in a positive or negative way. For example, unreacted species called inhibitors interrupt enzymatic activity.

Several enzymes may fit into more than one class. A valuable reference on enzymes is "Industrial Enzymes", Scott, D., in *Kirk-Othmer Encyclopedia of Chemical Technology*, 3rd Edition, (editors Grayson, M. and EcKroth, D.) Vol. 9, pp. 173-224, John Wiley & Sons, New York, 1980. The disclosure of this reference relating to enzymes is incorporated herein by reference.

Proteases, a sub-class of hydrolases, are further divided into three distinct subgroups which are grouped by the pH optima (i.e. optimum enzyme activity over a certain pH range). These three subgroups are the alkaline, neutral and acids proteases. These proteases can be derived from vegetable, animal or microorganism origin; but, preferably are of the latter origin which includes yeasts, molds and bacteria. Examples of suitable commercially available alkaline proteases are Alcalase®, Savinase®, and Esperase®—all of Novo Industri AS, Denmark; Purafect® of Genencor International; Maxacal®, Maxapem® and Maxatase®—all of Gist-Brocase International NV, Netherlands; Optimase® and Opticlean® of Solvay Enzymes, USA and so on.

Commercial alkaline proteases are obtainable in liquid or dried form, are sold as raw aqueous solutions or in assorted purified, processed and compounded forms, and are comprised of about 2% to about 80% by weight active enzyme generally in combination with stabilizers, buffers, cofactors, impurities and inert vehicles. The actual active enzyme content depends upon the method of manufacture and is not critical, assuming the detergent solution has the desired enzymatic activity. The particular enzyme chosen for use in the process and products of this invention depends upon the conditions of final utility, including the physical product form, use pH, use temperature, and soil types to be degraded or altered. The enzyme can be chosen to provide optimum activity and stability for any given set of utility conditions.

Naturally, mixtures of different proteolytic enzymes may be used. While various specific enzymes have been described above, it is to be understood that any protease which can confer the desired proteolytic activity to the composition may be used and this embodiment of this invention is not limited in any way by specific choice of proteolytic enzyme.

In addition to proteases, it is also to be understood, and one skilled in the art will see from the above enumeration, that other enzymes which are well known in the art may also be used with the composition of the invention. Included are other hydrolases such as esterases, carboxylases and the like; and, other enzyme classes.

Further, in order to enhance its stability, the enzyme or enzyme admixture may be incorporated into various non-liquid embodiments of the present invention as a coated, encapsulated, agglomerated, prilled or marumerized form. Also, to enhance stability, the enzyme or enzyme admixture may be incorporated into various non-aqueous embodiments such as propylene glycol, glycerin, etc.

pH Adjusting Agents

Various pH adjusting agents can be utilized to alter the pH of the treatment composition. The pH adjusting agents can provide desired buffering systems. Exemplary alkaline pH adjusting agents include carbonate, bicarbonate, sodium hydroxide, tetraborate, and boric acid. A buffering system that includes carbonate and bicarbonate can provide an exemplary pH of between about 9 and about 10, a buffering system that includes carbonate and sodium hydroxide can provide an exemplary pH of between about 9 and about 11, and a buffering system that includes sodium tetraborate and boric acid can include a pH of between about 7.6 and about 9.2. The pH adjusting agent can include an acid to provide an acidic buffering system. Exemplary acids include citric acid, citrate, acetic acid, acetate, phosphoric acid, and phosphate. For example, a buffering system including citric acid and sodium hydroxide can provide an exemplary pH of between about 2.2 and about 6.5, a buffering system that includes sodium citrate and citric acid can provide an exemplary pH of between about 3.0 and about 6.2, a buffering system that includes sodium acetate and acetic acid can provide an exemplary pH of between about 3.6 and about 5.6, and a buffering system that includes sodium dihydrogen phosphate and disodium hydrogen phosphate can provide an exemplary pH of between about 5.8 and about 8.0.

Liquid Phase Composition

The liquid phase of the multiple phase treatment composition can be provided having a relatively high concentration of active component. It should be understood that the active component or actives refers to the non-aqeous component of the liquid phase. The liquid phase can be provided having almost any actives concentration. In certain circumstances, it may be desirable to provide the liquid phase with an actives concentration of at least about 1 wt. %. In addition, it may be desirable to provide the liquid phase with an actives concentration of at least about 2 wt. %, at least about 5 wt. %, or at least about 10 wt. %. As discussed previously, once the liquid phase is applied as a result of its presence in the multiple phase treatment composition, it can be diluted with water to provide a lower concentrate aqueous composition, and that lower concentrate composition can be recirculated if desired.

Membrane Treating Programs

Various different treatment programs can be used to treat a membrane according to the invention. It is expected that commonly available membrane treating programs can be altered to include one or more treatment using multiple phase flow. For example, the application of a cleaning solution in a commonly available membrane treating program can be replaced with a multiple phase flow cleaning solution. In addition, the sanitizing and/or preserving steps that may be found in commonly available membrane treating programs can be replaced with multiple phase flow for delivering sanitizing and/or preserving solutions. It should be understood that multiple phase flow can be used in combination with other steps that involve liquid flow. And a treatment process or program that includes at least one multiple phase flow step and other liquid flow steps can be characterized as a hybrid treatment method.

The method for treating a membrane can include a plurality of steps. A first step can be referred to as a product removal step or displacement where product (whey, milk, etc.) is removed from the filtration system. The product can be effectively recovered and used as opposed to discharging as plant effluent. In general, the product removal step can be characterized as an exchange step where water, gas, or multiple phase flow displaces the product from the membrane system. The use of multiple phase flow is a surprisingly effective method for displacing and recovering product along with removal of some of the foulants with minimal water consumption as compared to a conventional flooded liquid flow method. The product removal step can last as long as it takes to remove and recover product from the filtration system. In general, it is expected that the product removal step will take at least a couple minutes for most dairy filtration systems.

Another step often used can be referred to as a pre-rinse step. In general, water and/or an alkaline solution can be circulated in the filtration system to remove gross soils. Multiple phase flow offers an alternative pre-rinse step that utilizes less water than liquid flow while still removing much of the gross soils.

If the displacement and/or pre-rinse steps are used with liquid flow (that is, water, for example, is used to displace product and rinse the filtration system), multiple phase flow can be used to remove the liquid from the filtration system. Accordingly, multiple phase flow can provide for removal of product, loose soils, and excess liquid from the system. The use of gas phase only could potentially dry out the membranes and thereby damage the membranes. For large scale filtration systems, it is expected that steps of product recovery and pre-rinse using multiple phase flow containing air and water will take at least about 2 minutes, and will take less than about 15 minutes. It should be understood that a large scale filtration system refers to an industrial system having at least about 10 membrane vessels, at least about 40 membranes, and a total membrane area of at least about 200 $m^2$. Industrial filtration systems for use in dairy and brewery applications often include about 10 to about 200 membrane vessels, about 40 to about 1,000 membranes, and a total membrane area of about 200 $m^2$ to about 10,000 $m^2$.

In addition to product displacement and pre-rinse steps, multiple phase flow can be used to provide cleaning, sanitizing, preserving, rinsing, and/or pre-treatment. It should be understood that a method of treating a separation facility (or membranes) according to the invention can include multiple phase flow in any of the above-identified steps and can include a combination of multiple phase flow and conventional, liquid flow.

During a multiple phase flow step when it is intended to contact the membrane surface with a liquid phase, it is generally desirable to run the multiple phase flow for a sufficient amount of time to wet the membrane surface. For large scale filtration systems, it is expected that the multiple phase flow will last at least about 3 minutes in order to provide sufficient wetting of the membrane surface. In addition, it is expected that sufficient wetting will occur in less than about 10 minutes. In addition, the multiple phase flow can be provided as a single pass or as a recirculation. When recurring to single pass or recirculation, it should be understood that references being made to the liquid phase. That is, if the liquid phase passes across the membrane and collects in the tank for disposal or subsequent use during a later step, the step can be referred to as single pass. When the liquid phase is collected and recycled during that step, the step can be referred to as a recirculation. It is expected that certain types of chemistry may be difficult to recirculate because of foaming. Accordingly, it may be necessary to use those chemistries in a single pass operation. Recirculation is desirable in order to conserve chemicals. It should be understood that chemicals can be conserved by recycling. That is, chemicals can be recovered and used in a subsequent step.

After the liquid phase has been delivered to the membrane surface, the multiple phase flow can be turned off and the chemistry can be allowed to interact with the membrane and/or the soil on the membrane surface in a soaking step. It should be understood that this soak step can be provided as an optional step. If the multiple phase flow is provided as a recirculation flow, it may be unnecessary to turn off the multiple phase flow to allow the chemistry to interact with the soil.

It is generally desirable to minimize the soak step in order to minimize the down time for the filtration system. When a soak step is utilized, it can be utilized for a time of between about 1 minute and about 15 minutes. It is expected that by providing chemicals on the filtration membrane having a higher concentration compared with conventional, liquid delivery of chemicals, the interaction between the chemistry and the soil can take place at a more rapid rate.

After a liquid phase has been applied to a membrane surface as a result of multiple phase flow, the filtration system can be flooded with liquid such as water, and the water can be recirculated through the filtration system. This type of liquid phase recirculation is often referred to cross-flow. If the liquid phase applied during the multiple phase flow is relatively highly concentrated, it is expected that dilution with water to provide liquid flow will result in a decrease in concentration. Accordingly, one option for practicing the invention includes applying a liquid phase at a relatively high concentrate in order to achieve a desired effect as a result of the high concentration, and then introducing a liquid such as water to provide a flooded system that can be recirculated to provide conventional, flooded cleaning. The concentration of the chemical agent during the flooded treatment can be the same as that encountered conventionally. Alternatively, it can be lower as a result of the increased concentration applied as a result of two-phase flow and its subsequent effect on the membrane and/or soil on the membrane. Furthermore, the treatment system can be designed to provide less down time pared with a conventional, flooded system.

When providing a flooded, liquid phase recirculation, it is expected that warmer liquid may be desirable to boost performance. Many membranes tolerate a temperature of not greater than about 120° F. Accordingly, one can take advantage of the temperature effect by introducing liquid at a temperature of less than about 120° F.

It should be understood that while one option is to deliver the liquid phase by multiple phase flow, optionally let the liquid phase soak on the membrane, and flood the system with water to provide a flooded, liquid recirculation, an alternative approach is to provide multiple phase recirculation. In addition, multiple phase rinse can be provided where the treatment composition is rinsed from the membranes after it has completed its intended effect, such as cleaning, sanitizing, or preserving.

The flooded cross-flow procedure can be continued for a length of time sufficient to move soil off the membrane surface. When the process includes a flooded recirculation step, it is expected that the flooded recirculation step will take place for between about 5 minutes and about 15 minutes.

The filtration system can include an additional soaking step with periodic recirculation. The additional soak step, if used, can take between about 2 minutes and about 10 minutes.

A cross-flow or multiple phase rinse step can be provided to help remove the chemistry out of the filtration system.

Several chemistry treatment cycles can be repeated for acid treatment, alkaline treatment, and neutral treatment. In general, the various treatments can be provided with or without an enzyme.

The liquid component of the multiple phase invention can be provided as an alkaline treatment, an acidic treatment, a neutral treatment, a solvent treatment and/or as an enzymatic treatment.

The multiple phase cleaning solution can be provided having a ratio of the gaseous phase to the liquid phase that is sufficient to deliver a desired concentration of the liquid phase to the membrane surface to provide the desired treatment and/or detersive properties. In general, it is expected that the volumetric ratio of the gaseous phase to the liquid phase will be at least about 5:1. The volumetric ratio of the gaseous phase to the liquid phase can be provided at between about 5:1 and about 75,000:1. The air volume can be about 10 SCFM to about 1,000 SCFM depending on facility characteristics such as vessel size, number of membranes, number of separation stages, etc.

The flow rate of the cleaning solution across the membrane should be sufficient to provide a desired level of contact between the liquid phase and the membrane. It is expected that the flow rate of the cleaning solution will depend upon the size of the membrane to be cleaned. In general, it is expected that the flow rate will be about 1 ft/sec. to about 200 ft/sec.

By way of example, various compositions can be used in various multiple phase treatment steps. For example, product displacement and/or flushing can be accomplished with air or a mixture of air and water. The use of a mixture of air and water is preferred to minimize damage to the membrane by, for example, drying. Rinsing can be accomplished with a mixture of air and water, and can include neutral, acidic, or alkaline solutions. Cleaning can be accomplished using air and a cleaning composition that can include alkaline, acid, enzymes, non-aqueous components, and/or surfactants. Sanitizing and/or preserving can be accomplished with air and a composition that includes chlorine, acids, peracids, and/or reducing compositions. A penetrant is generally considered to be a component that penetrates into the soil and softens the soil for removal. The penetrant can be selected for the particular type of soil expected on the membrane. In the case of membranes used in the dairy industry, it is expected that the penetrant will be selected to provide for penetration into protein and lipid soils.

The following examples were carried out to compare techniques for processing membranes using multiple phase flow. The following describes the soiling and analysis process used to adequately verify and compare membrane treatment processes.

EXAMPLES

Filtration Equipment

Tests were performed using a Model 92 Lab Unit manufactured by Filtration Engineering. The Model 92 is designed for accurately assessing new membrane applications on a pilot plant scale before installation to a full-scale industrial process. The Model 92 utilizes either a single 4 inch diameter by 40 inch long or 4 inch diameter by 160 inch long stainless steel membrane vessel which can house a single membrane or 4 membranes, respectively that is very often the same sized membrane used on large scale industrial processes.

Membrane Type

The membranes used in these examples were spiral-wound ultrafiltration membranes measuring 3.8 inch diameter by 38 inch long and manufactured by GE Osmonics, model PW3838C Durasan. These polyethersulfone membranes have a 66 square feet of membrane surface area and are characterized by a 10,000 molecular weight cut-off. These membranes are typically used for industrial filtration of whey solutions.

Pre-Cleaning

The membrane was first rinsed by placing the membrane into a membrane vessel and circulating 17 gallons of a 77° F. deionized (DI) water for 30 minutes with an inlet pressure of 30 psig and an outlet pressure of 15 psig. The membrane was then pre-cleaned by circulating 17 gallons of a 122° F. chlorinated alkaline solution (0.5 wt. % Ultrasil 25 from Ecolab, Inc.) for 30 minutes with an inlet pressure of 30 psig and an outlet pressure of 15 psig. The solution was drained. The membrane was rinsed by circulating 17 gallons of 77° F. DI water with an inlet pressure of 30 psig and an outlet pressure of 15 psig. The rinse solution was allowed to drain. The step of rinsing was repeated 3 times. The adequacy of the rinsing was verified by conductivity measurements.

Clean Water Flux (CWF) Analysis

The clean membrane was examined prior to soiling by performing a standard clean water flux typically calculated as gallons per square foot of membrane surface area per day or commonly abbreviated as "GFD" or calculated as liters per square meter of membrane surface area commonly abbreviated as "LMH." A cross-flow measurement was performed by documenting the permeate flow rate at 1 and 3 minutes during the circulation of 17 gallons of 122° F. DI water with an inlet pressure of 30 psig and an outlet pressure of 15 psig using a graduated container or flow meter.

Soiling

The membrane was removed from the vessel and 25 pounds of whole milk powder was added to deionized water to produce 30 gallons of a 10% whole milk solution. With the membrane out of the vessel, the whole milk solution was circulated for about 30 minutes at 122° F. to ensure that the milk was completely solubilized. The membrane was returned to the vessel and the whole milk powder solution at 122° F. was circulated with an inlet pressure of 45 psig and an outlet pressure of 30 psig. For the first 30 minutes the permeate and concentrate streams were allowed to circulate back into the balance tank. At various time periods the permeate flow rate was measured and documented to ensure soiling was occurring. For an additional 20 minutes, circulation through the membrane continued, although the permeate stream was sent to drain to create a more concentrated milk soil solution. The total soiling time was 50 minutes. The milk solution was drained from the system and the membrane removed from the vessel. The equipment was rinsed by circulating DI water. This procedure was also used for the soiling of from 1 to 4 membranes in series.

Post-Soil Flux Analysis

The membrane was placed into the vessel and the permeate flux was measured at 1 and 3 minutes in the "dead-end" mode to minimize soil removal during the analysis. With an inlet pressure of 30 psig and an outlet pressure of 30 psig, 17 gallons of 77° F. DI water was circulated while the permeate flux was measured.

Membrane Treatment

Next the membrane was subjected to either a conventional cleaning program or a multiple phase cleaning program or a hybrid cleaning program using both multiple phase and single phase flow.

Post Treatment Analysis

Similar to the "Clean Water Flux Analysis", flux measurements were documented and compared to the initial clean water flux measurements to determine the effectiveness of a given membrane treatment.

Example 1

Exemplary Conventional Membrane Treatment

The following procedure was performed on an ultrafiltration membrane to document a conventional treatment. The membrane was analyzed and soiled as the above procedures describe. After soiling, the flux decrease to 7% of the original value indicating a severely soiled membrane. Table 4 describes the treatment parameters. During this treatment process the inlet pressure was 30 psig and the outlet pressure was 15 psig creating a cross-flow process. These parameters resulted in a total flow rate of about 30 gallons per minute. Table 5 describes the treatment results where "% Flux Recovery" is a direct measurement of the efficacy of the treatment. Using conventional procedures and Ultrasil chemistry from Ecolab, Inc., the % Flux Recovery was 82% which for a new membrane is quite typical.

Membrane type=Ultrafiltration, polyethersulfone
Manufacturer/Model=GE Osmonics, PW3838C Durasan
Pressure (in)=30 psig
Pressure (out)=15 psig
Transmembrane Pressure=22.5 psig

TABLE 4

| Step | Chemistry | Total Volume (gallons) | Time (minute) | Temp (deg F.) |
|---|---|---|---|---|
| Rinse | Deionized water | 17 | 10 | ambient |
| Alkaline/ Enzyme Wash | Ultrasil 67 - 0.3% v/v Ultrasil 69 - 0.5% v/v | 13 | 30 | 122 |
| 3 Rinses | Deionized water | 3 × 17 = 51 | 3 × 2 = 6 | ambient |
| Acid Wash | Ultrasil 76 - 0.3% v/v | 17 | 15 | 122 |
| 3 Rinses | Deionized water | 3 × 17 = 51 | 3 × 2 = 6 | ambient |
| | TOTALS: | 149 | 67 | |

TABLE 5

| Measurement | Ave Initial (GFD) | Ave Final (GFD) | Flux Recovery |
|---|---|---|---|
| Cross-flow CWF | 76.1 | 62.1 | 82% |

The following examples demonstrate the details and usefulness of this invention. Ultrasil 67 includes a stabilized composition containing enzymes, surfactants and stabilizers and is available from Ecolab Inc. Ultrasil 69 includes alkaline builders, buffers and water conditioners and is available from Ecolab Inc. These types of chemistries are an example of buffered systems that are allowed to be concentrated and used with this invention while still remaining within the chemical compatibility limitations of the membranes. The temperature recorded in the example was the temperature of the wash solution at the exit of the membrane. The chemical injection rate refers to the speed of the fluid injecting pump. Reference to "Cross-Flow" indicates a membrane treatment utilizing a conventional liquid flooded cross-flow hydraulic procedure. Reference to "Multiple Phase Flow" indicates a membrane treatment that includes the injection of a gas phase in combination with a liquid phase in a non-flooded system. The combination of the Cross-Flow and Multiple Phase Flow for membrane treatments is referred to as a novel hybrid membrane treatment process.

Example 2

A hybrid membrane treatment utilizing both conventional cross-flow treatment and multiple phase air/liquid treatment was evaluated. The ability to use a higher concentration of buffered enzyme product was also evaluated. This highly concentrated chemistry was approximately ten times the typical use concentration and had a pH of 9.62 which is within the pH limitations of these particular UF membranes. After soiling, the membrane had a flux of 6% of the clean water flux indicating a severely soiled membrane. In this example a single-pass multiple phase treatment was performed during the alkaline/enzyme step meaning the solution was not re-circulated, but rather passed over the membrane and then to drain. Table 6 describes the treatment parameters and Table 7 provides the results of the treatment as measured by permeate flux. Using the conventional and multiple phase flow hybrid approach with the higher concentration of chemistry resulted in a 90% flux recovery using 16 minutes less time (24% reduction) and 9 gallons less total liquid (6% decrease) than a conventional membrane treatment.

TABLE 7

| Measurement | Ave Initial (GFD) | Ave Final (GFD) | Flux Recovery |
|---|---|---|---|
| Cross-flow CWF | 62.2 | 55.8 | 90% |

Example 3

Various liquid injection rates and air flow rates were tested to determine a reasonably low air and liquid combination while still obtaining adequate coverage of the ultrafiltration membrane. This was a visual observation based upon the flow and converage of the liquid out of the downstream end of the membrane. It was also intended to ensure that the majority of air and liquid does not permeate. After observing various test parameters, it was determined that the conditions of air delivery at 10 psig and liquid flow of 0.38 gpm resulted in a good atomized flow from the downstream end of a single 4 inch diameter by 38 inch long polysulfone membrane. This results in an air volume of about 20 scfm, a velocity of about 2-4 fps and an air to liquid ratio of about 183:1 to 307:1.

Example 4

A hybrid membrane treatment utilizing both conventional cross-flow treatment and multiple phase air/liquid treatment was evaluated. During the multiple phase flow, the air flow was decreased to 10 psig, the liquid injection rate was decreased to 0.38 gpm and the buffered enzyme chemistry concentration was decreased resulting in a 33% reduction in total chemistry as compared to the conventional cleaning example. After soiling, the flux was at 8% of the clean water flux indicating a severely soiled membrane. Table 8 describes the treatment parameters and Table 9 provides the

TABLE 6

Membrane type = Ultrafiltration, polyethersulfone
Manufacturer/Model = GE Osmonics, PW3838C Durasan

| Step | Details | Chemistry | Total Volume (gallons) | Time (minute) | Temp (deg F.) |
|---|---|---|---|---|---|
| Rinse | [1]Cross-flow | Deionized water | 17 | 10 | ambient |
| Alkaline - Enzyme | [2]Single-pass multiple phase flow | Ultrasil 67 - 3.0% Ultrasil 69 - 5.0% | 4 | 4 | 120 |
| Soak | No flow | Same as previous step | 0 | 10 | ambient |
| 3 Rinses | Cross-flow | Deionized water | 3 × 17 = 51 | 3 × 2 = 6 | ambient |
| Acid Wash | Cross-flow | Ultrasil 76 - 0.3% | 17 | 15 | 122 |
| 3 Rinses | Cross-flow | Deionized water | 3 × 17 = 51 | 3 × 2 = 6 | ambient |
| | | TOTALS: | 140 | 51 | |

[1]Reference to "Cross-flow" in this table is defined as a conventional flooded liquid flow:
P(in) = 30 psig
P(out) = 15 psig
[2]Multiple phase flow parameters (non-flooded):
Air = 25 psig
Air Volume = 206 acfm (actual cubic feet per minute)
Chemical injection rate = 1.0 gpm (gallons per minute)
Air to Liquid volumetric ratio = 1540 to 1
4" diameter pipe velocity = 39.3 fps (feet per second)

results of the treatment. The treatment did remove some of the soil based upon the flux recovery of 42% from a soiled flux of 8%, but was not as effective as Example 1. Compared to conventional treatment, this example used 26 minutes less time (39% reduction).

TABLE 8

Membrane type = Ultrafiltration, polyethersulfone
Manufacturer/Model = GE Osmonics, PW3838C Durasan

| Step | Details | Chemistry | Total Volume (gallons) | Time (minute) | Temp (deg F.) |
|---|---|---|---|---|---|
| Rinse | [3]Cross-flow | Deionized water | 17 | 10 | 77 |
| Alkaline - Enzyme | [4]Single-pass multiple phase flow | Ultrasil 67 - 1.7% Ultrasil 69 - 2.9% | 1.52 | 4 | 120 |
| Soak | No flow | Same as previous step | 0 | 10 | ambient |
| 3 Rinses | Cross-flow | Deionized water | 3 × 17 = 51 | 3 × 2 = 6 | ambient |
| Acid Wash | Cross-flow | Ultrasil 76 - 0.3% | 17 | 15 | 122 |
| 3 Rinses | Cross-flow | Deionized water | 3 × 17 = 51 | 3 × 2 = 6 | ambient |
| | | TOTALS: | 138 | 51 | |

[3]Reference to "Cross-flow" in this table is defined as a conventional flooded liquid flow:
P(in) = 30 psig
P(out) = 15 psig
[4]Multiple phase flow parameters:
Air = 10 psig
Air Volume = 81 acfm
Chemical injection rate = 0.38 gpm
Air to Liquid volumetric ratio = 1599 to 1
4" diameter pipe velocity = 15.5 fps

TABLE 9

| Measurement | Ave Initial (GFD) | Ave Final (GFD) | Flux Recovery |
|---|---|---|---|
| Cross-flow CWF | 55.8 | 23.5 | 42% |

Example 5

A hybrid membrane treatment utilizing both conventional cross-flow treatment and multiple phase air/liquid treatment was evaluated. During the multiple phase flow, the air flow was at 15 psig with a liquid injection rate of 1.25 gpm using alkaline/enzymatic chemistry. During the multiple phase flow treatment the high concentrated chemistry was recirculated to conserve chemistry. After this step, the high concentrated chemistry was diluted to a conventional concentration and allowed to circulate in a cross-flow mode to further enhance soil removal. Table 10 describes the treatment parameters and Table 11 provides the results of the treatment. The treatment did remove much of the soil based upon the flux recovery of 71%. Compared to conventional treatments, this example used 29 minutes less (19% reduction), although some of the time savings can be attributed to improved conventional rinsing methods.

TABLE 10

| Step | Details | Chemistry | Total Volume (gallons) | Time (minute) | Temp (deg F.) |
|---|---|---|---|---|---|
| Rinse | [5]Cross-flow | Deionized water | 30 | 1 | ambient |
| Air Flush | Air only to remove liquid | Air | 0 | 0.75 | ambient |
| Alkaline-Enzyme | [6]Recirculation multiple phase flow | [7]Ultrasil 67–1.0% Ultrasil 69–2.1% | 4 | 10 | 100 |
| Soak | No flow | Same as previous step | 0 | 10 | ambient |
| Dilute chemistry and circulate | Cross-flow | Deionized water | 9 | 10 | 122 |

TABLE 10-continued

| Step | Details | Chemistry | Total Volume (gallons) | Time (minute) | Temp (deg F.) |
|---|---|---|---|---|---|
| Rinse | Cross-flow | Deionized water | 30 | 1 | ambient |
| Acid Wash | Cross-flow | Ultrasil 76–0.3% | 17 | 15 | 122 |
| Rinse | Cross-flow | Deionized water | 30 | 1 | ambient |
| | TOTALS: | | 120 | 49 | |

[5] Reference to "Cross-flow" in this table is defined as a conventional flooded liquid flow:
P(in) = 30 psig
P(out) = 15 psig
6 Multinle phase flow parameters:
Air = 15 psig
Air Volume = 122 acfm
Chemical injection rate = 1.25 gpm
Air to Liquid volumetric ratio = 731 to 1
4" diameter pipe velocity = 23.3 fps
[7] No surfactant was used during the Multiple Phase treatment to minimize foam for adequate pumping of solution during recirculation.

TABLE 11

| Measurement | Ave Initial (GFD) | Ave Final (GFD) | Flux Recovery |
|---|---|---|---|
| Cross-flow CWF | 58.2 | 41.2 | 71% |

Example 6

A hybrid membrane treatment utilizing both conventional cross-flow treatment and multiple phase air/liquid treatment was evaluated. During the multiple phase flow, the air flow was at 15 psig with a liquid injection rate of 1.9 gpm using alkaline/enzymatic chemistry. During the multiple phase flow treatment the high concentrated chemistry was recirculated to conserve chemistry. After this step, the high concentrated chemistry was diluted to a conventional concentration and allowed to circulate in a cross-flow mode to further enhance soil removal. Table 12 describes the treatment parameters and Table 13 provides the results of the treatment. The treatment was highly effective based upon the permeate flux recovery of 113%. Compared to conventional treatments, this example did not save on time or volume but did demonstrate a new and novel hybrid treatment technique for membranes.

TABLE 12

Membrane type = Ultrafiltration, polyethersulfone
Manufacturer/Model = GE Osmonics, PW3838C Durasan

| Step | Details | Chemistry | Total Volume (gallons) | Time (minute) | Temp (deg F.) |
|---|---|---|---|---|---|
| Rinse | [8]Cross-flow | Deionized water | 30 | 1 | ambient |
| Air Flush | Air only to remove liquid | Air | 0 | 0.5 | ambient |
| Alkaline - Enzyme | [9]Recirculation multiple phase flow | [10]Ultrasil 67 - 1.0% Ultrasil 69 - 2.1% | 4 | 10 | 100 |
| Soak | No flow | Same as previous step | 0 | 10 | ambient |
| Dilute chemistry and circulate | Cross-flow | Deionized water | 9 | 10 | 122 |
| Rinse | Cross-flow | Deionized water | 30 | 1 | ambient |
| Acid Wash | Cross-flow | Ultrasil 76 - 0.3% | 17 | 15 | 122 |
| Rinse | Cross-flow | Deionized water | 30 | 1 | ambient |
| | TOTALS: | | 120 | 49 | |

[8] Reference to "Cross-flow" in this table is defined as a conventional flooded liquid flow:
P(in) = 30 psig
P(out) = 15 psig
[9] Multiple phase flow parameters:
Air = 15 psig
Air Volume = 122 acfm
Chemical injection rate = 1.9 gpm
Air to Liquid volumetric ratio = 481 to 1
4" diameter pipe velocity = 23.3 fps
[10] No surfactant was used during the Multiple Phase treatment to minimize foam for adequate pumping of solution during recirculation.

TABLE 13

| Measurement | Ave Initial (GFD) | Ave Final (GFD) | Flux Recovery |
| --- | --- | --- | --- |
| Cross-flow CWF | 45.0 | 50.9 | 113% |

An ultrafiltration membrane was place in the pilot plant membrane skid as previously described. For the multiple phase flow, a minimum amount of air was used with various liquid injection rates of heated water. The purpose was to determine if there was adequate coverage of the membrane determined by measuring the temperature at the top and bottom of the vessel. At an air flow inlet pressure of 9.5 psig, 76 scfm, velocity of 8-14 fps and a liquid injection rate of 2.0 gpm, the resulting air to liquid ratio was about 172:1 to 283:1. Injection of heated water of about 115 deg F. resulted in a top vessel temperature of 109 deg F. and a bottom vessel temperature of 115 deg F. This demonstrates that at these multiple phase conditions adequate coverage of a given membrane treatment solution occurs. Furthermore this demonstrates, that relatively high flow velocity may not be required if concentrated chemistries are used to treat membranes chemically as opposed to treating with high velocity mechanical forces.

Example 8

A hybrid membrane treatment utilizing both conventional cross-flow treatment and multiple phase air/liquid treatment was evaluated. During the multiple phase flow, the air flow was at 17 psig with a liquid injection rate of 2.0 gpm using a concentrated alkaline/enzymatic chemistry. After soiling, the water flux was at about 13% of the clean value indicating a severely soiled membrane. During the multiple phase flow treatment the high concentrated chemistry was recirculated to conserve chemistry. The chemistry was allowed to be concentrated at about 6.5 times the conventional concentration due to the ability to use a reduced volume of liquid while still obtaining adequate circulation. During treatment, the top of the membrane vessel was 94° F. while the bottom of the vessel was at 95° F., indicating excellent treatment composition coverage over the horizontally aligned membrane. After this step, the high concentrated chemistry was diluted to a conventional concentration and allowed to circulate in a cross-flow mode to further enhance soil removal. The alkaline step of the cleaning program resulted in a 53% decrease in time by requiring a total of 14 minutes as compared to a conventional program requiring about 30 minutes for the alkaline step. Table 14 describes the treatment parameters and Table 15 provides the results of the treatment. The treatment was very effective based upon the permeate flux recovery of 100%. Compared to conventional treatments, this example eliminated 16.5 minutes (34% reduction) in total treatment time.

TABLE 14

Membrane type = Ultrafiltration, polyethersulfone
Manufacturer/Model = GE Osmonics, PW3838C Durasan

| Step | Details | Chemistry | Total Volume (gallons) | Time (minute) | Temp (deg F.) |
| --- | --- | --- | --- | --- | --- |
| Rinse | [11]Cross-flow | Deionized water | 30 | 1 | ambient |
| Air Flush | Air only to remove liquid | Air | 0 | 0.5 | ambient |
| Alkaline - Enzyme | [12]Recirculation multiple phase flow | [13]Ultrasil 67 - 1.0% Ultrasil 69 - 2.1% | 2 | 4 | 100 |
| Soak | No flow | Same as previous step | 0 | 5 | ambient |
| Dilute chemistry and circulate | Cross-flow | Deionized water | 11 | 5 | 122 |
| Rinse | Cross-flow | Deionized water | 30 | 1 | ambient |
| Acid Wash | Cross-flow | Ultrasil 76 - 0.3% | 17 | 15 | 122 |
| Rinse | Cross-flow | Deionized water | 30 | 1 | ambient |
| | | TOTALS: | 120 | 32.5 | |

[11]Reference to "Cross-flow" in this table is defined as a conventional flooded liquid flow:
P(in) = 30 psig
P(out) = 15 psig
[12]Multiple phase flow parameters:
Air = 17 psig
Air Volume = 92 acfm
Chemical injection rate = 2.0 gpm
Air to Liquid volumetric ratio = 344 to 1
4" diameter pipe velocity = 17.6 fps
[13]No surfactant was used during the Multiple Phase treatment to minimize foam for adequate pumping of solution during recirculation.

TABLE 15

| Measurement | Ave Initial (GFD) | Ave Final (GFD) | Flux Recovery |
| --- | --- | --- | --- |
| Cross-flow CWF | 51.0 | 51.0 | 100% |

Example 9

To further simulate an industrial vessel, using the membrane pilot plant equipment and protocols as previously described, four 3.8 inch diameter by 38 inch membranes were placed in series in a membrane vessel and soiled with a 10% whole milk solution. After soiling all four membranes were individually tested for water flux and ranged from 9-13% of their original clean water flux indicating highly soiled conditions on the membranes. They were treated in series using multiple phase flow with a chlorinated alkaline surfactant based chemistry consisting of 0.5% Ultrasil 25, 0.05% Ultrasil 01 and 0.15% XY-12; all of which are commercially available from Ecolab, Inc. The inlet pressure was set at 42 psig resulting in an air volume of 678 scfm, 34-130 fps. With the liquid injection rate set at 1.32 gpm, the resulting air to liquid ratio was 1000:1 to 3800:1. Temperature of the treatment solution ranged from 94 to 100 deg F. as measured at the retentate outlet. The acidic treatment solution consisted of 0.3% Ultrasil 76 also available from Ecolab, Inc. The treatment program utilized the multiple phase flow conditions previously described. Steps consisted of a 10 minute water rinse, 20 minute alkaline treatment, 10 minute water rinse, 10 minute acid treatment, 10 minute rinse, 30 minute alkaline treatment and a final 10 minute water rinse. Adequate rinse times were determined based upon conductivity measurements. The flux recovery of the four membranes was 43%, 40%, 34% and 25% respectively as they were stacked front to back in the horizontal vessel. The permeation of the treatment solution during the multiple phase flow was measured to be about 80% indicating that only 20% of the treatment solution was allowed to cross-flow tangential to the membrane. It is believed that the air pressure was above the bubble point pressure of the membranes thereby causing too much treatment solution to permeate. This is also evident by the fact that the membrane's flux recoveries were better in the front and progressively worsened towards the downstream. It is believed that this can be explained due to the greater volume of air and treatment solution near the front, but near the back 80% had already permeated thereby leaving only 20% for cross-flow. This demonstrates the requirement of the multiple phase flow to use air pressures below the bubble point pressure for each particular membrane type and treatment solution. The bubble point pressure is dependent upon many factors including membrane pore size, membrane type, surface tension of treatment solution and other chemical and physical parameters. It is also demonstrated in this example that if the particular treatment requires permeation, such as the case of achieving adequate antimicrobial treatment solution contact to the permeate side, the bubble point pressure can purposely be surpassed to maximize permeation.

Example 10

Using the membrane pilot plant equipment and protocols as previously described, four 3.8 inch diameter by 38 inch membranes were placed in series in a membrane vessel and soiled with a 10% whole milk solution. They were treated in series using a hybrid multiple phase flow and single phase flow. For the alkaline treatment step the multiple phase flow chemistry was Ultrasil 67 and Ultrasil 69 at a concentration of about 4 times the recommended use rates for conventional cleaning. The increased concentration is economically feasible given that one can circulate 75% less total solution using multiple phase flow which is due to the fact that the vessels and piping do not require a flooded state. After the 10 minute multiple phase treatment, a 10 minute soak step occurred, after which water was added to the system and allowed to circulate through the membranes in a single phase conventional manner for another 10 minutes. This addition of water diluted the concentrated chemistry to recommended use concentrations and circulated to remove any remaining soils. In this example, conventional single phase rinses and acid treatments followed. The complete program resulted in a 32% CIP time reduction as compared to a conventional single phase alkaline/chlorinated and acid CIP program. This particular program did not result in total water volume savings. Parameters for the multiple phase flow included an air inlet pressure of 14 psig, air volume of 20 scfm, velocity of 3 to 5 fps, liquid injection rate of 1.8 gpm at 120 deg F. This results in a air to liquid volume ratio of about 42:1 to 81:1. Resulting water flux recoveries were 94% for the total four membrane system and 78%, 79%, 85% and 116% respectively. It is expected that the improvement in this example can be at least partly attributed to the concentrated buffered treatment solution, the hybrid treatment method and the lower air pressure to minimize treatment solution permeation.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for cleaning a filtration system comprising:
    (a) removing liquid product from the filtration system and recovering at least a part of the liquid product:
    (b) flooding the filtration system with a first aqueous media to remove at least a portion of solids in the filtration system;
    (c) flushing the filtration system with a gaseous media to remove at least a portion of the first aqueous media;
    (d) treating the filtration system with a multiple phase treatment composition comprising a gaseous phase and a liquid phase;
    (e) soaking the filtration system for at least about 1 minute following the step of treating the filtration system with a multiple phase treatment composition;
    (f) flooding the filtration system with a second aqueous media; and
    (g) rinsing the filtration system.

2. A method according to claim 1, wherein the liquid product comprises a food product.

3. A process according to claim 1, wherein the liquid product comprises a dairy product.

4. A method according to claim 1, wherein the filtration system comprises a spiral wound membrane.

5. A method according to claim 1, wherein the step of removing liquid product comprises displacing the liquid product with water.

6. A method according to claim 1, wherein the first aqueous media comprises water.

7. A method according to claim 1, wherein the first aqueous media comprises an alkaline solution having a pH of between about 8 and about 13.

8. A method according to claim 1, wherein the step of flooding the filtration system with a first aqueous media comprises circulating the first aqueous media within the filtration system for at least about 10 minutes.

9. A method according to claim 1, wherein the step of flushing the filtration system with a gaseous media comprises flushing for less than about 5 minutes.

10. A method according to claim 1, wherein the step of treating with a multiple phase treatment composition comprises applying the multiple phase treatment composition for at least about 3 minutes.

11. A method according to claim 1, wherein the step of flooding the filtration system with a second aqueous media comprises recirculating the second aqueous media for between about 5 minutes and about 15 minutes.

12. A method according to claim 1, wherein the second aqueous media comprises water having a temperature of between about 100° F. and about 120° F.

* * * * *